(12) United States Patent
Kajita et al.

(10) Patent No.: US 8,620,396 B2
(45) Date of Patent: Dec. 31, 2013

(54) SLIDE MECHANISM AND ELECTRONIC APPARATUS

(75) Inventors: Kazuaki Kajita, Hino (JP); Toshiaki Maebara, Sagamihara (JP)

(73) Assignee: NEC Corporation, Tokyo (JP)

( * ) Notice: Subject to any disclaimer, the term of this patent is extended or adjusted under 35 U.S.C. 154(b) by 618 days.

(21) Appl. No.: 12/487,629

(22) Filed: Jun. 18, 2009

(65) Prior Publication Data

US 2010/0016043 A1 Jan. 21, 2010

(30) Foreign Application Priority Data

Jul. 18, 2008 (JP) ................................. 2008-187414

(51) Int. Cl.
*H04M 1/00* (2006.01)

(52) U.S. Cl.
USPC .................. 455/575.4; 455/575.1; 455/575.2; 455/575.3

(58) Field of Classification Search
USPC .............. 455/575.1–575.4; 16/258, 271, 284, 16/296, 327, 345, 352, 362, 348, 357, 359, 16/361
See application file for complete search history.

(56) References Cited

U.S. PATENT DOCUMENTS

| | | | |
|---|---|---|---|
| 2006/0017700 A1* | 1/2006 | Kemppinen | 345/169 |
| 2006/0056141 A1* | 3/2006 | Pihlaja et al. | 361/683 |
| 2006/0114646 A1 | 6/2006 | Koibuchi et al. | |
| 2007/0032278 A1* | 2/2007 | Lee et al. | 455/575.4 |
| 2007/0060220 A1* | 3/2007 | Hsu | 455/575.4 |

FOREIGN PATENT DOCUMENTS

| | | |
|---|---|---|
| CN | 1864339 | 11/2006 |
| CN | 2010 39241 | 3/2008 |
| JP | 2007-067892 | 3/2007 |

* cited by examiner

*Primary Examiner* — Rafael Pérez-Gutiérrez
*Assistant Examiner* — Thai Vu
(74) *Attorney, Agent, or Firm* — Cozen O'Connor

(57) ABSTRACT

Slide mechanism includes: a slide pin; a base in which formed are a first guide portion guiding the pin upwardly and downwardly and a first hook portion formed integrally with and bent to the right from the upper end of the portion; a slider slidable upwardly and downwardly relative to the base, in which formed are a second guide portion guiding the pin upwardly and downwardly, a second hook portion formed integrally with upper end of the second guide portion and bent to the left, and a runout formed integrally with lower end of the second guide portion; and an urging mechanism that has one end attached to the pin and the other end attached rotatably to base such that the vertical position of the other end is between both ends of the first guide portion, and that urges the pin away from the other end.

20 Claims, 20 Drawing Sheets

SLIDE MECHANISM AND ELECTRONIC APPARATUS

BACKGROUND OF THE INVENTION

1. Field of the Invention

The present invention relates to a slide mechanism and an electronic apparatus, and particularly to a slide mechanism and an electronic apparatus that enable their slider or housing to be moved with a low load.

2. Description of the Related Art

Recently, slide cellular phones have become popular. Such cellular phones have the rear surface of their front housing joined to the front surface of their rear housing by a slide mechanism. Hence, the rear housing can slide upward and downward relative to the front housing. Some cellular phones allow their rear housing to slide both upward and downward from a closed state, in which the rear housing entirely overlaps with the front housing. For example, Unexamined Japanese Patent Application KOKAI Publication No. 2007-67892 discloses the following cellular phone. This cellular phone presents its rear housing to function as an operation unit when the rear housing is drawn downward relative to the front housing. Meanwhile, the rear housing functions as a camera or the like when it is drawn upward relative to the front housing. Accordingly, each function of the rear housing can be used selectively based on the function that a user wants to enjoy.

However, when to be drawn either upward or downward relative to the front housing, the rear housing has to be slid manually over its entire sliding range. Likewise, when to be slid back to the closed state from the drawn-out state, the rear housing has to be slid manually over its entire sliding range. Hence, sliding requires a substantial force.

SUMMARY OF THE INVENTION

An object of the present invention is to make it possible to reduce a load of a sliding operation.

To achieve the above object, a slide mechanism according to a first aspect of the present invention includes:

a slide member;

a base in which a first guide portion and a first hook portion are formed, the first guide portion guiding the slide member in a first direction, the first hook portion being formed integrally with one end of the first guide portion and bent at the one end of the first guide portion, the slide member being able to be hooked on the first hook portion;

a slider that is slidable relative to the base in the first direction and in which a second guide portion, a second hook portion, and a runout are formed, the second guide portion guiding the slide member in the first direction, the second hook portion being formed integrally with one end of the second guide portion, the slide member being able to be hooked on the second hook portion, the runout being formed integrally with the other end of the second guide portion; and an urging mechanism whose one end is attached to the slide member and whose other end is rotatably attached to the base such that a position of the other end of the urging mechanism in the first direction is between both ends of the first guide portion, the urging mechanism urging the slide member away from the other end of the urging mechanism.

To achieve the above object, an electronic apparatus according to a second aspect of the present invention includes:

a front housing;

a rear housing facing the front housing; and the slide mechanism according to claim 1, wherein the base is attached to the front housing, and the slider is attached to the rear housing.

According to the present invention, it is possible to reduce a load of sliding a slider with the use of an urging mechanism. It is also possible to change the urging direction according to the position of the slider.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Preferred embodiments for carrying out the present invention will be explained below with reference to the drawings. Note that the embodiments to be described below are limited in various manners that are technically preferred for carrying out the present invention, but the scope of the invention is not meant to be limited to the embodiments below and illustrated examples.

<First Embodiment>

Figure 1:
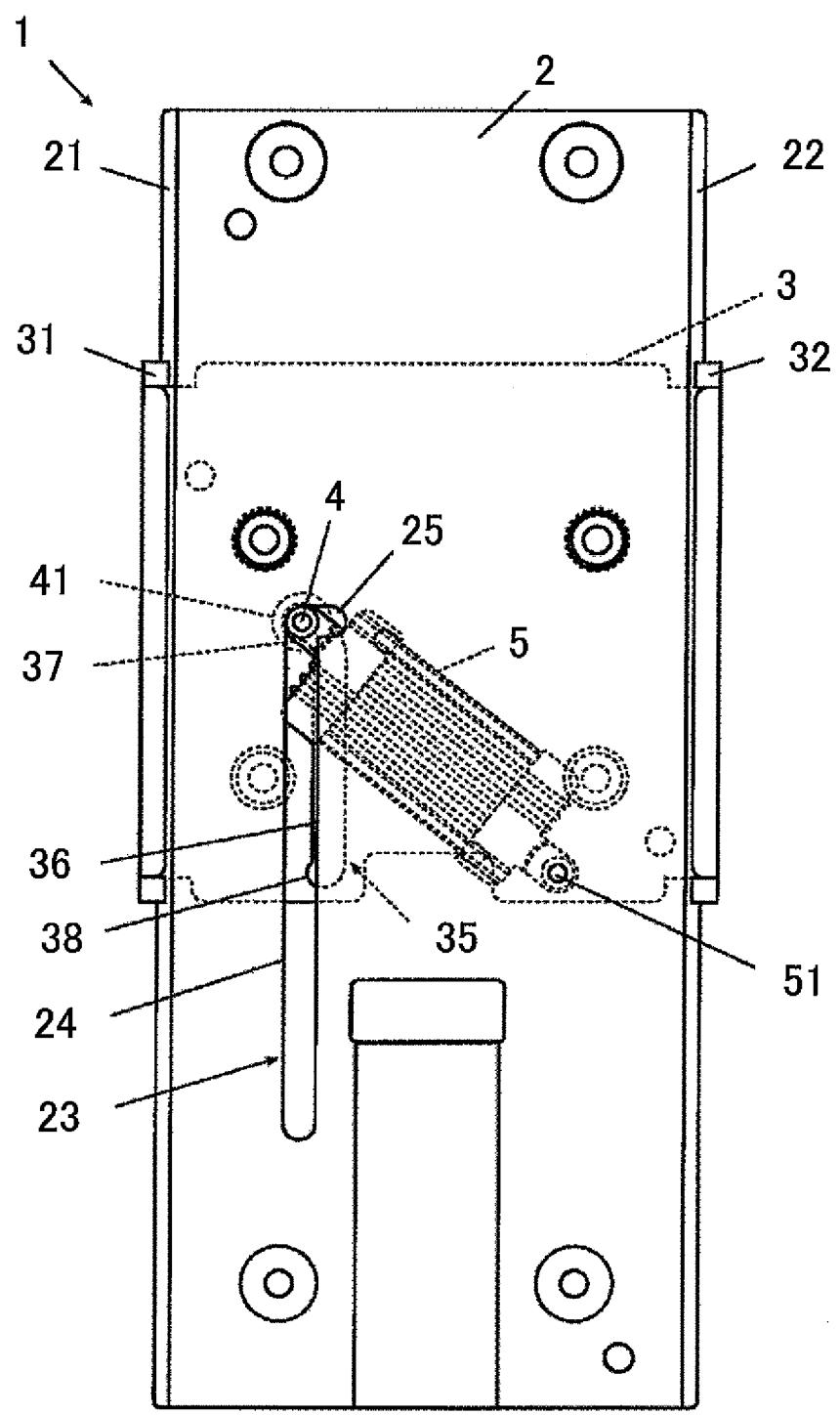
FIG. 1 is a front elevation showing a slide mechanism according to the first embodiment of the present invention.
Figure 2:
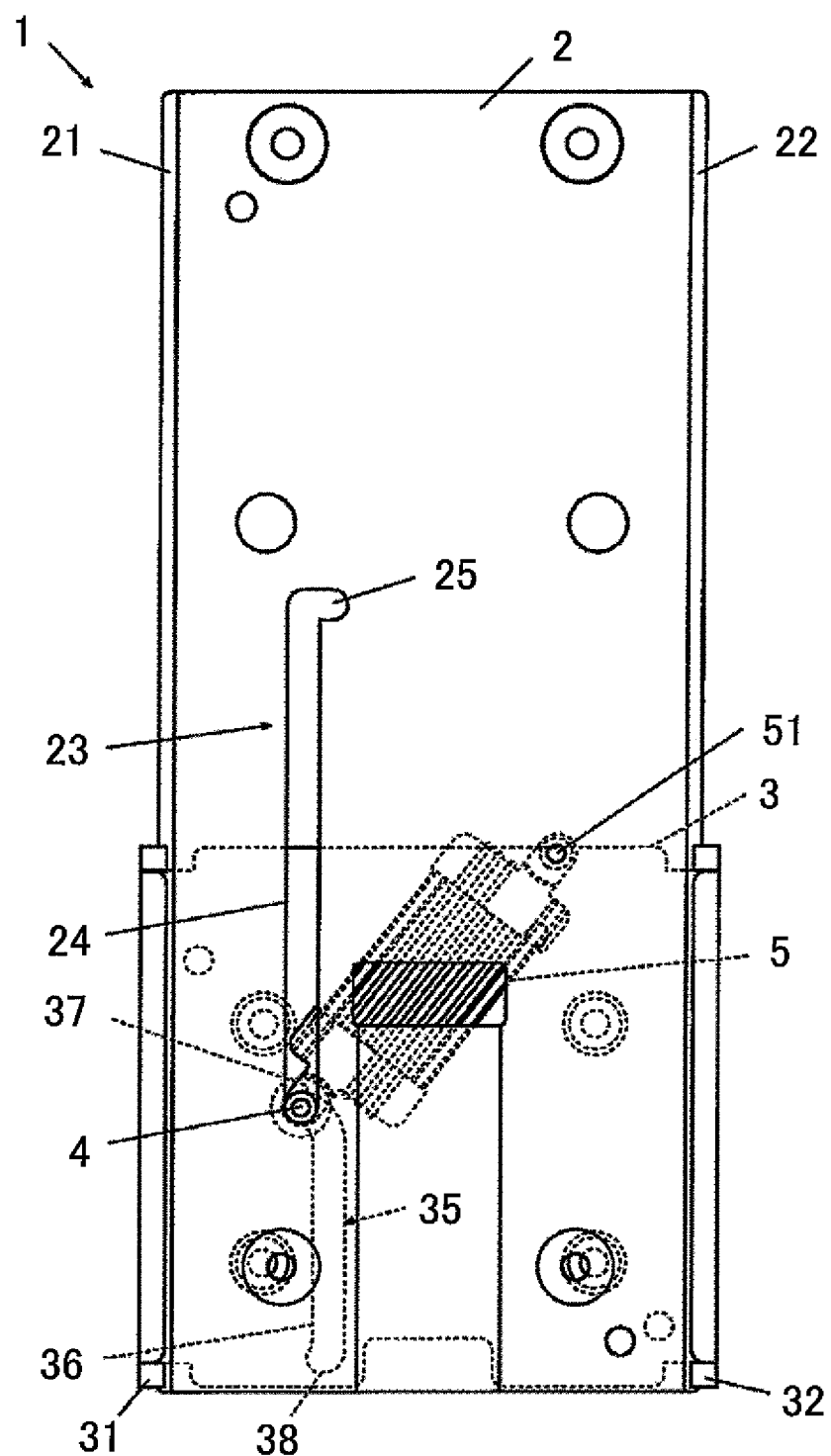
FIG. 2 is a front elevation showing the slide mechanism.
Figure 3:
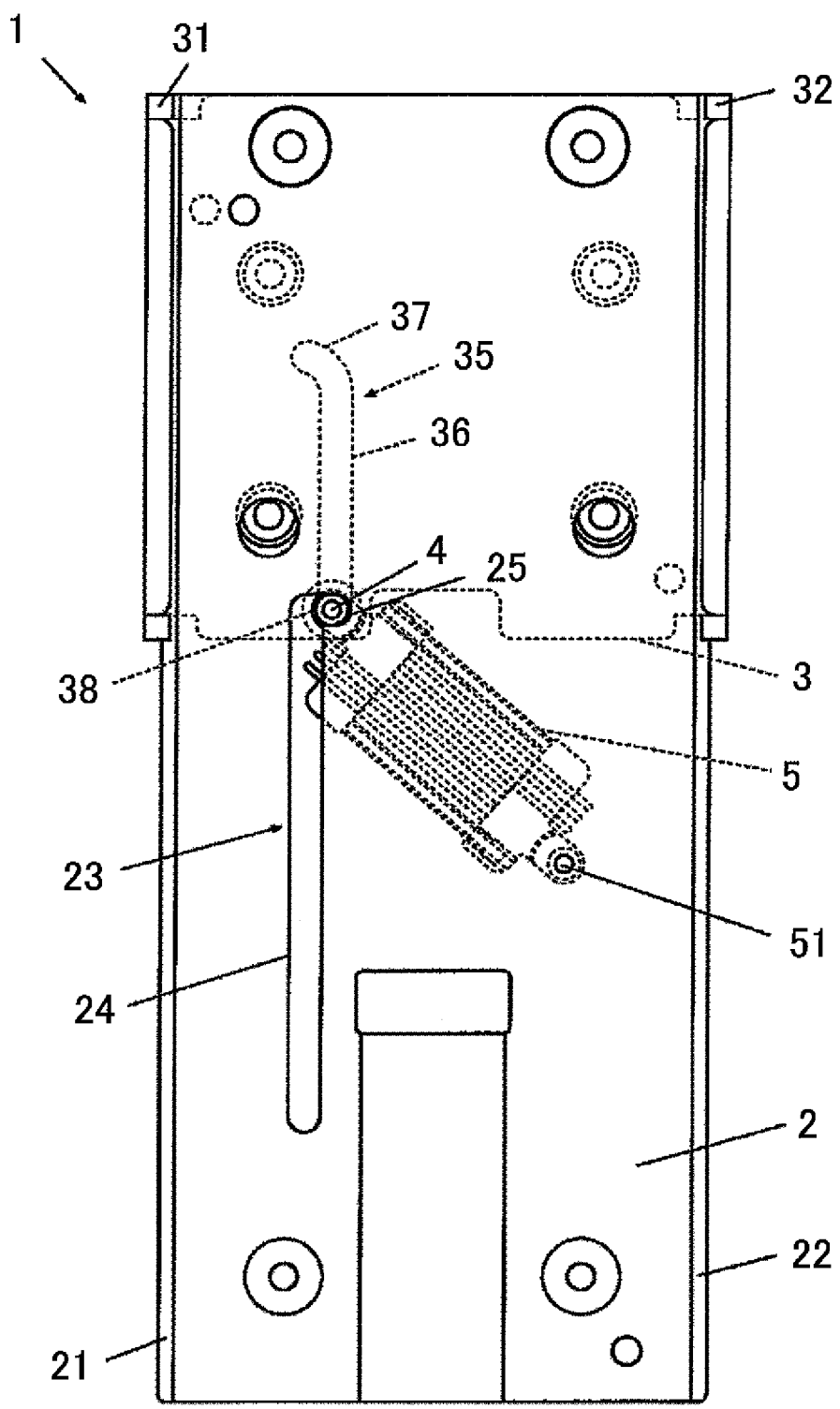
FIG. 3 is a front elevation showing the slide mechanism.
Figure 4:
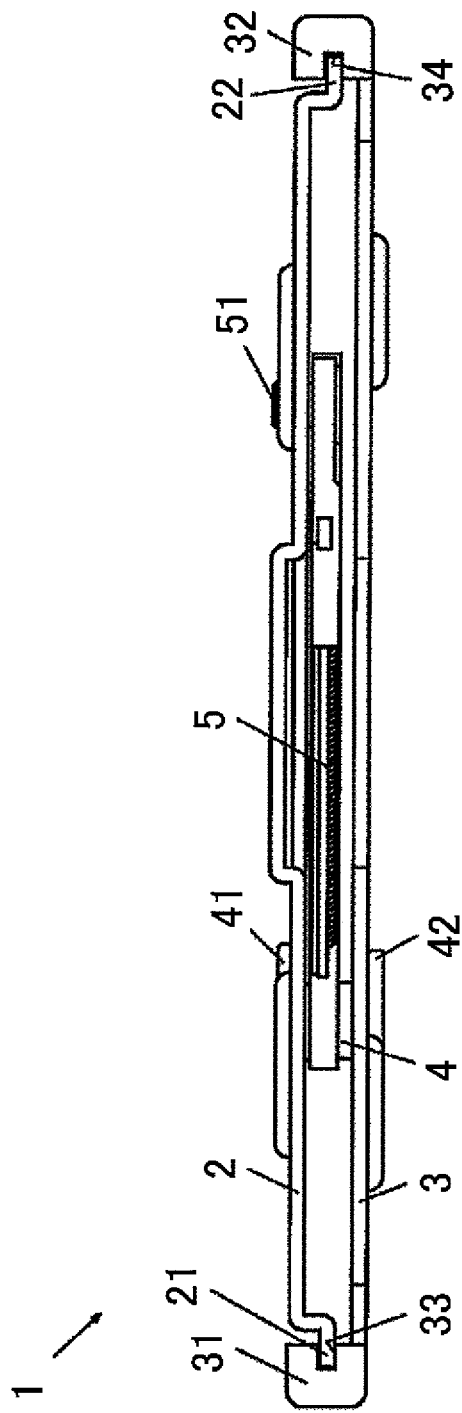
FIG. 4 is a side elevation showing the slide mechanism.

FIG. 1 to FIG. 3 are front elevations of a slide mechanism 1. FIG. 4 is a side elevation of the slide mechanism 1.

As shown in FIG. 1 to FIG. 4, the slide mechanism 1 includes a base 2, a slider 3, a slide pin 4, an urging mechanism 5, and the like.

On both the left and right side ends of the base 2 are formed guide rails 21 and 22. The guide rails 21 and 22 are formed straight in the vertical direction. The base 2, including its guide rails 21 and 22 on both sides, is made of metal.

A guide 23 is formed at a left portion of the base 2. The guide 23 is a groove that is opened through the base 2 from its rear surface to its front surface. The guide 23 may be a groove that is recessed in the rear surface of the base 2. In this case too, the front elevation view is the same as in FIG. 1.

The guide 23 comprises a first guide portion 24 that extends straight in the vertical direction and a first hook portion 25. The first hook portion 25 is formed integrally with the upper end of the first guide portion 24 and bent rightward at the right angle at the upper end of the first guide portion 24. The first guide portion 24 is parallel with the guide rails 21 and 22.

The slider 3 is formed in a shape of a thin plate. The slider 3 is provided on the rear surface of the base 2. The rear surface of the base 2 and the slider 3 have a gap therebetween. Carriages 31 and 32 are attached on both the left and right sides of the slider 3 respectively. Slits 33 and 34, whose dimensions are greater in the vertical direction, are formed in the carriages 31 and 32 respectively. The guide rail 21 is inserted in the slit 33. The guide rail 22 is inserted in the slit 34. The carriage 31 is slidable along the guide rail 21. The carriage 32 is slidable along the guide rail 22. Hence, the slider 3 can slide upward and downward relative to the base 2. The carriages 31 and 32 are made of resin. Hence, the carriages 31 and 32 are highly lubricative on the guide rails 21 and 22 that are made of metal. Note that the vertical direction is not necessarily the direction in which a gravity force works, but the direction in which the slider 3 slides relative to the base 2.

Figure 5:
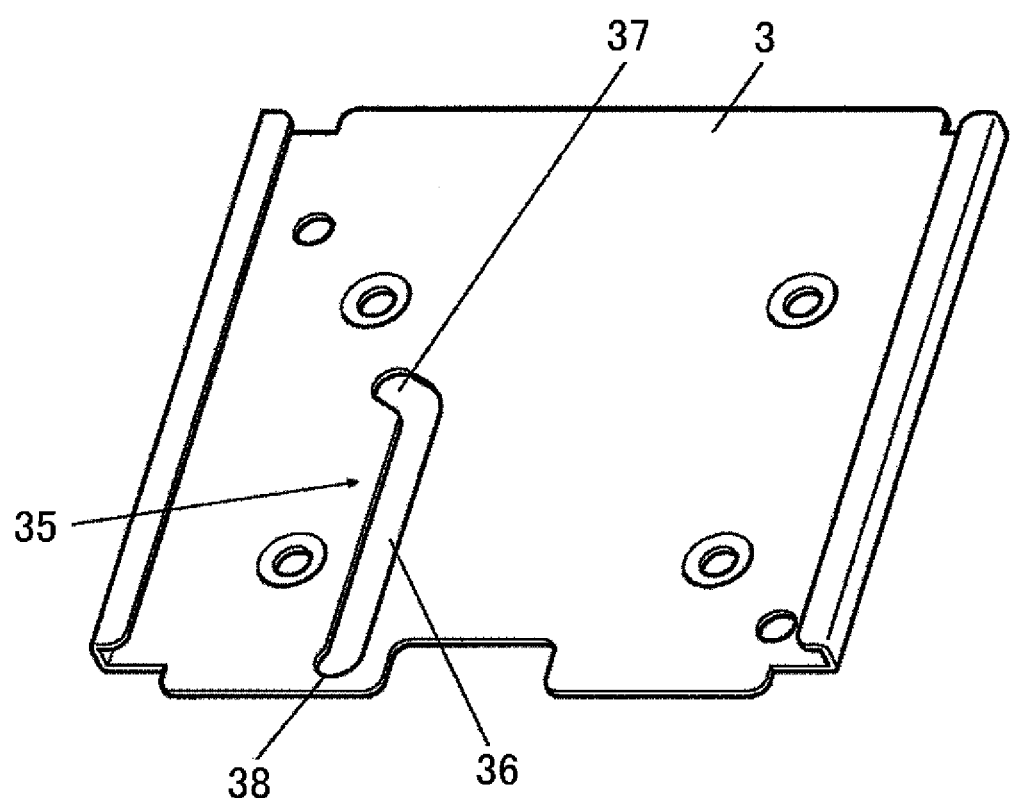
FIG. 5 is a perspective diagram showing a slider provided in the slide mechanism.

As shown in FIG. 5, a guide 35 is formed at a left portion of the slider 3. The guide 35 is a groove that is opened through the slider 3 from its rear surface to its front surface. The guide 35 may be a groove that is recessed in the front surface of the slider 3. In this case too, the front elevation view is the same as in FIG. 1.

The guide 35 comprises a second guide portion 36, a second hook portion 37, and a runout 38. The second guide portion 36 extends straight in the vertical direction. The second hook portion 37 is formed integrally with the upper end of the second guide portion 36 and bent at the upper end of the second guide portion 36 obliquely upward to the left. The runout 38 is bent toward the left at the lower end of the second guide portion 36. The guide 35 is independent of the guide 23. Therefore, the guide 35 and the guide 23 can have arbitrary lengths.

As shown in FIG. 1 to FIG. 3, the second guide portion 36 of the guide 35 is parallel with the first guide portion 24 of the guide 23. The second guide portion 36 is more to the right than the first guide portion 24 is. The second hook portion 37 of the guide 35 and the first guide portion 24 of the guide 23 are at the same position in the horizontal direction. The first hook portion 25 of the guide 23 and the second guide portion 36 of the guide 35 are at the same position in the horizontal direction. The runout 38 runs to the position where it overlaps a right-hand portion of the first guide portion 24. That is, the runout 38 does overlap the first guide portion 24 of the guide 23 slightly, but does not reach the left edge of the first guide portion 24.

In FIG. 2, the slider 3 is at a position at which the lower end of the slider 3 coincides with the lower end of the base 2 (hereinafter, this position will be referred to as lowermost position). In this case, the lower end of the first guide portion 24 overlaps with the tip of the second hook portion 37. In FIG. 3, the slider 3 is at a position at which the upper end of the slider 3 coincides with the upper end of the base 2 (hereinafter, this position will be referred to as uppermost position). In this case, the runout 38 overlaps with a left-hand portion of the first hook portion 25. In FIG. 1, the slider 3 is at a predetermined position between the uppermost position and the lowermost position (hereinafter, this position will be referred to as original position). In this case, the upper end of the first guide portion 24 overlaps with the tip of the second hook portion 37.

As shown in FIG. 1 to FIG. 3, the slide pin 4 is inserted into the guide 23 and the guide 35. The slide pin 4 is guided by the guide 23 along the guide 23. The slide pin 4 is also guided by the guide 35 along the guide 35. As shown in FIG. 4, flanges 41 and 42 are provided on both ends of the slide pin 4. The flange 41 is hooked on the front surface of the base 2 at both sides of the guide 23 (not shown in FIG. 4). The flange 42 is hooked on the rear surface of the slider 3 at both sides of the guide 35 (not shown in FIG. 4). Hence, the slide pin 4 is protected from slipping off from the guides 23 and 35. Since the flange 41 is on the front surface of the base 2, the flange 41 conceals part of the guides 23 and 35 when illustrated. Hence, in FIG. 1 to FIG. 3, the flange 41 is illustrated with a broken line to make the guides 23 and 35 visible.

As shown in FIG. 1 to FIG. 4, the urging mechanism 5 is provided between the rear surface of the base 2 and the front surface of the slider 3. One end of the urging mechanism 5 is attached to the slide pin 4. The opposite end portion of the urging mechanism 5 is attached to the base 2 by means of a rotation shaft 51 at a position that is on the right of the guide 23 and the guide 35. The position of the opposite end portion of the urging mechanism 5 (i.e., the position of the rotation shaft 51) in the vertical direction is between the upper end and lower end of the first guide portion 24. The urging mechanism 5 urges the slide pin 4 away from the rotation shaft 51.

Figure 6:
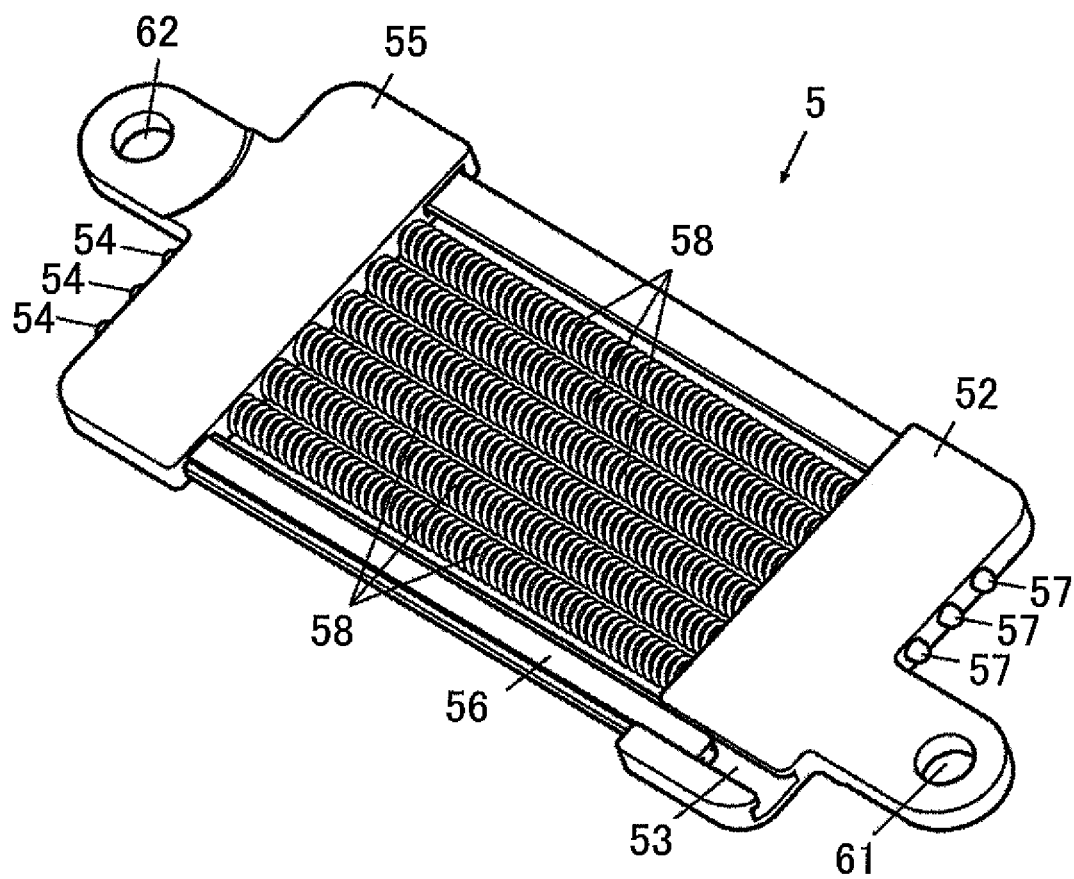
FIG. 6 is a perspective diagram showing an urging mechanism provided in the slide mechanism.

FIG. 6 is a perspective view of the urging mechanism 5. The urging mechanism 5 has a guide rail 53 that is formed in a first movable portion 52, and a slide member 56 that is formed on a second movable portion 55. The slide member 56 is brought into the guide rail 53. Hence, the slide member 56 can slide along the guide rail 53. The first movable portion 52 has a plurality of slide rods 54. The slide rods 54 are parallel with the guide rail 53. The slide rods 54 are inserted into holes opened in the second movable portion 55. Hence, the slide rods 54 can slide relative to the second movable portion 55. Likewise, the second movable portion 55 has a plurality of slide rods 57, which can slide relative to the first movable portion 52. Compression springs 58 are wound around the slide rods 54 and 57 respectively. The compression springs 58 are held between the first movable portion 52 and the second movable portion 55. The first movable portion 52 has an attachment hole 61. The rotation shaft 51 (not shown in FIG. 6) is axially supported in the attachment hole 61. The second movable portion 55 has an attachment hole 62. The slide pin 4 (not shown in FIG. 6) is axially supported in the attachment hole 62. The compression springs 58 urge the slide pin 4 and the rotation shaft 51 away from each other.

Figure 7:
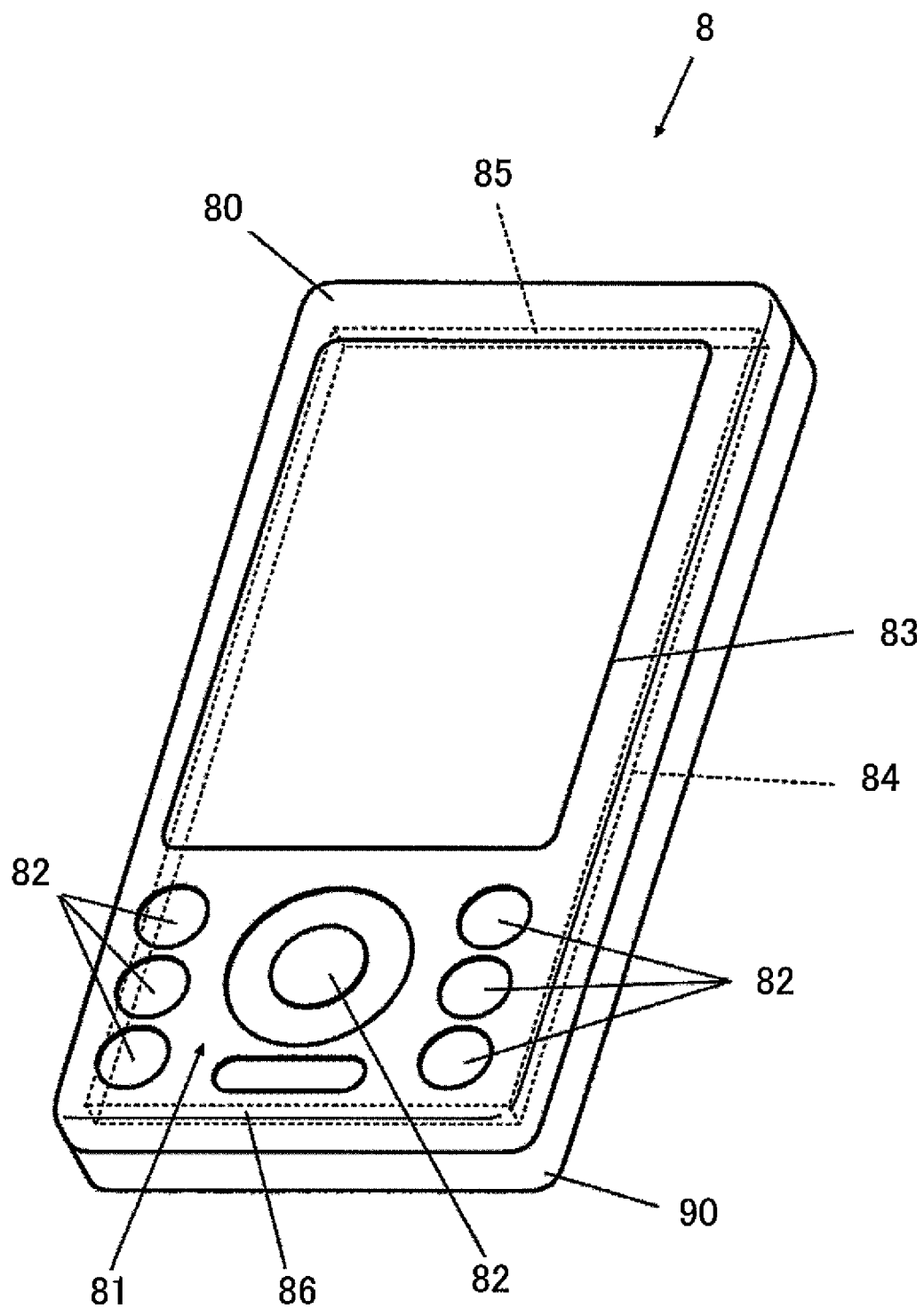
FIG. 7 is a perspective diagram showing an electronic apparatus provided with the slide mechanism.
Figure 8:
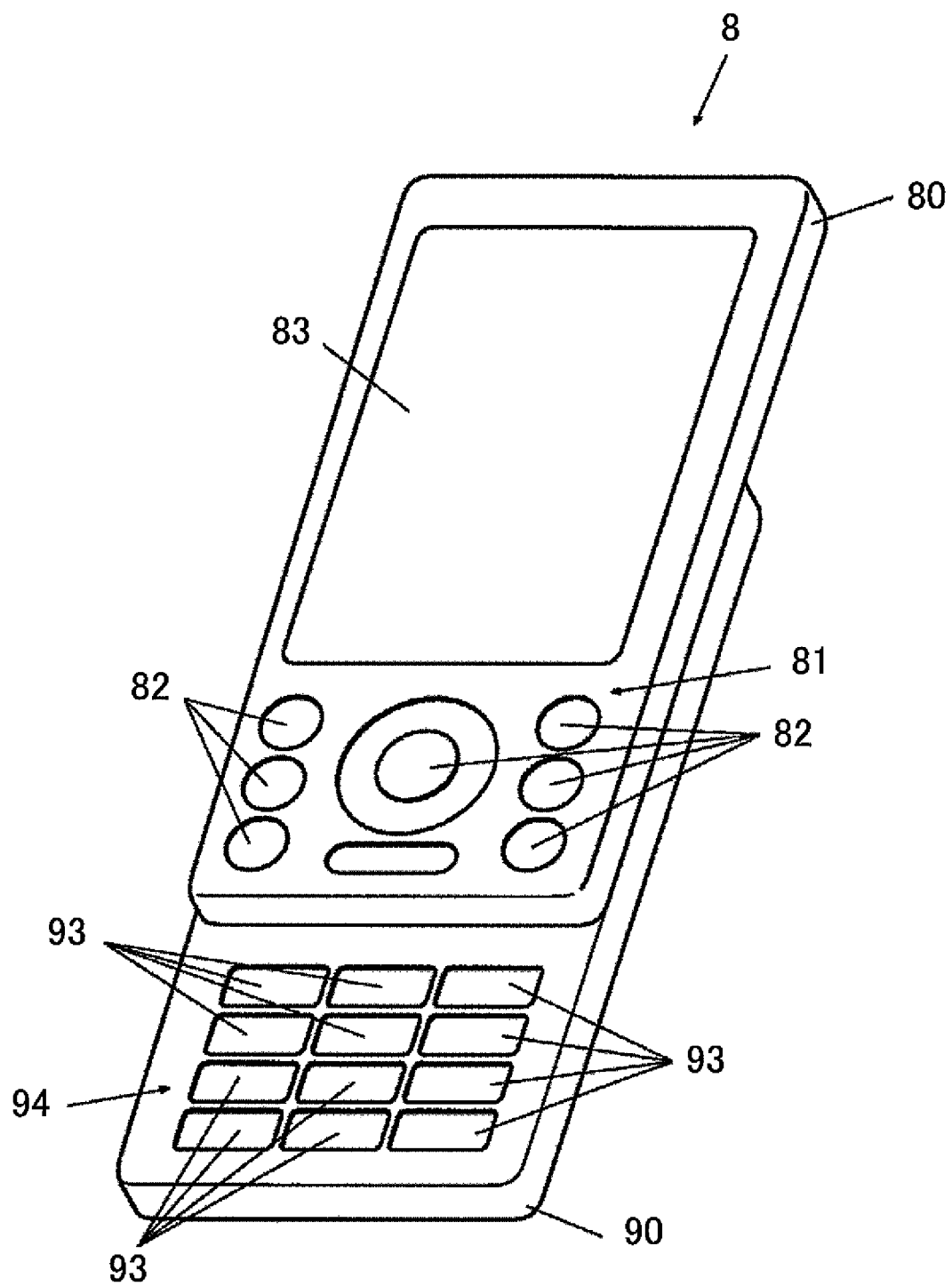
FIG. 8 is a perspective diagram showing the electronic apparatus.
Figure 9:
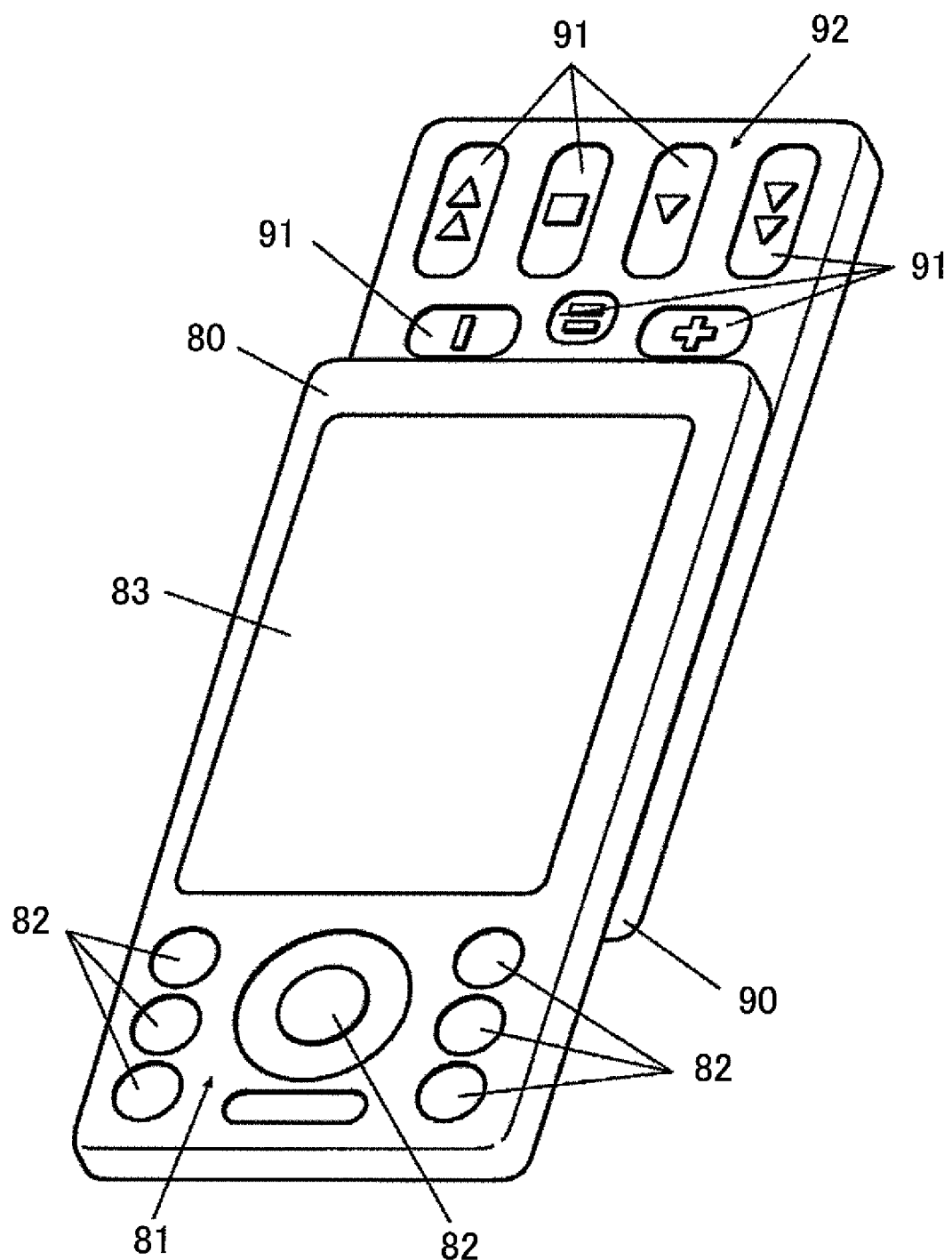
FIG. 9 is a perspective diagram showing the electronic apparatus.

The slide mechanism 1 having the configuration described above is incorporated in a portable electronic apparatus 8 as shown in FIG. 7 to FIG. 9. The electronic apparatus 8 may be a cellular phone, a personal computer, a digital camera, a PDA (Personal Digital Assistance), an electronic notebook, a portable radio, or any other electronic apparatus. In addition to the slide mechanism 1, the electronic apparatus 8 includes a front housing 80 and a rear housing 90 that are joined together slidable relative to each other by the slide mechanism 1.

A rectangular opening 84 is formed in the rear surface of the front housing 80. The base 2 (not illustrated in FIG. 7 to FIG. 9) is set in the opening 84. Hence, the opening 84 is closed up by the base 2. The base 2 is fixed on the front housing 80 by screws. The slider 3 (not shown in FIG. 7 to FIG. 9) partially comes inside the opening 84. The slider 3 is fixed on the front surface of the rear housing 90 by screws. Hence, the range over which the slider 3 can slide is from the position (uppermost position), at which the upper end of the slider 3 contacts an upper wall surface 85 of the opening 84, to the position (lowermost position), at which the lower end of the slider 3 contacts a lower wall surface 86 of the opening 84.

On the lower portion of the front surface of the front housing 80 is provided an input unit 81 having a plurality of push buttons 82, etc. A display section 83 having a liquid crystal display, an EL display, or the like is provided on a portion of the front surface of the front housing 80 that is upward of the input unit 81.

On a portion of the front surface of the rear housing 90 that is upward of the slider 3 is provided a first input unit 92 having a plurality of push buttons 91, etc. A second input unit 94 having a plurality of push buttons 93, etc. is provided on a portion of the front surface of the rear housing 90 that is downward of the slider 3. The input units 92 and 94 may be a direction input device (for example, a trackball pointing device, an optical pointing device, or a capacitive pointing device). A display unit may be provided instead of the input units 92 and 94 or together with the input units 92 and 94. Such a display unit may have a transparent touch sensor on its display surface. Alternatively, a camera unit having an imaging device, a lens, etc. may be provided instead of the input units 92 and 94 or together with the input units 92 and 94.

FIG. 7 shows a state of the electronic apparatus 8 when the slider 3 is at the original position (FIG. 1). In this state, the upper end of the front housing 80 and the upper end of the rear housing 90 are at the same position in the vertical direction. The lower end of the front housing 80 and the lower end of the rear housing 90 are also at the same position in the vertical direction. Therefore, the entire front surface of the rear housing 90 is covered by the front housing 80. The input units 92 and 94 are hidden behind the front housing 80.

FIG. 8 shows a state of the electronic apparatus 8 when the slider 3 is at the lowermost position (FIG. 2). In this state, the lower end of the rear housing 90 is downward of the lower end of the front housing 80. That is, the portion of the front surface of the rear housing 90 that is downward of the slider 3 is positioned downward of the front housing 80. Hence, the second input unit 94 is revealed. When the slider 3 is at the lowermost position, the lower end of the slider 3 contacts the lower wall surface 86 of the opening 84. Hence, the rear housing 90 does not slide further downward of this position.

FIG. 9 shows a state of the electronic apparatus 8 when the slider 3 is at the uppermost position (FIG. 3). In this state, the upper end of the rear housing 90 is upward of the upper end of the front housing 80. That is, the portion of the front surface of the rear housing 90 that is upward of the slider 3 is positioned upward of the front housing 80. Hence, the first input unit 92 is revealed. When the slider 3 is at the uppermost position, the upper end of the slider 3 contacts the upper wall surface 85 of the opening 84. Hence, the rear housing 90 does not slide further upward of this position.

Next, operational manners and workings of the slide mechanism 1 and the electronic apparatus 8 will be explained.

(1) When the Slider 3 is at the Original Position (FIG. 1, FIG. 7)

The slide pin 4 is hooked on the second hook portion 37 and positioned at the tip of the second hook portion 37. The slide pin 4 is positioned at the upper end of the first guide portion 24. The slide pin 4 is urged obliquely upward to the left by the urging mechanism 5. The slide pin 4 pushes the slider 3 obliquely upward to the left. At this time, since the slide pin 4 hits on the upper-end corner of the first guide portion 24, the slide pin 4 is restricted against moving upward. Therefore, the slider 3 does not move upward but stays still at the original position. In this state, the second hook portion 37 extends in a radial direction around the rotation shaft 51.

(2) When the Slider 3 Slides from the Original Position to the Lowermost Position When a user slides the front housing 80 upward relative to the rear housing 90, the slider 3 slides downward relative to the base 2. At this time, the slide pin 4 slides downward along the first guide portion 24 while being hooked on the second hook portion 37. The urging mechanism 5 rotates about the rotation shaft 51 anticlockwise as seen in the front elevation view. As the slide pin 4 slides downward, it gets more urged by the urging mechanism 5. That is, the slide pin 4 shortens the distance to the rotation shaft 51 to make the first movable portion 52 and the second movable portion 55 closer to each other. This makes the compression springs 58 compressed to exert a stronger repulsive force. Then, when the slide pin 4 comes to the same position as the rotation shaft 51 in the vertical direction, the slide pin 4 has come at the shortest distance to the rotation shaft 51. Hence, the compression springs 58 have gained the strongest repulsive force. Note that when the slide pin 4 is positioned upward of the rotation shaft 51, the slide pin 4 is urged obliquely upward to the left by the urging mechanism 5. Hence, if the user loses hold of the front housing 80 or the rear housing 90 before the slide pin 4 comes to the same position as the rotation shaft 51 in the vertical direction, the slider 3 slides upward due to a component force of the urging force. As a result, the slider 3 returns to the original position.

Figure 10:
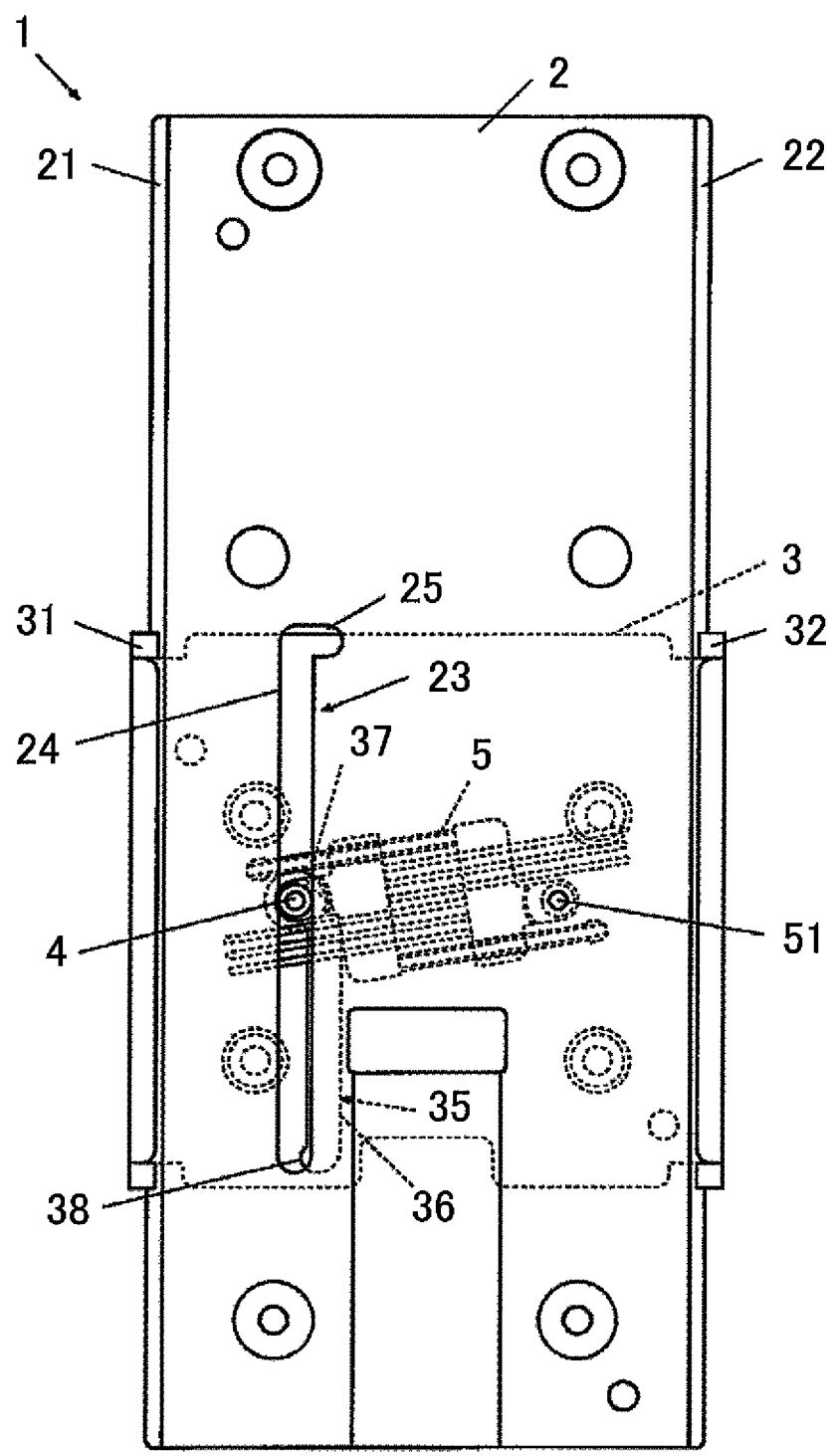
FIG. 10 is a front elevation showing the slide mechanism.

When the user slides the front housing 80 further upward relative to the rear housing 90, the slide pin 4 comes downward of the rotation shaft 51 (see FIG. 10). Once it does, the slide pin 4 is urged obliquely downward to the left by the urging mechanism 5. Hence, the slider 3 automatically slides downward relative to the base 2 as aided by the urging mechanism 5. This brings the front housing 80 to automatically slide upward relative to the rear housing 90.

Then, when the slider 3 moves to the lowermost position, all the push buttons 93 of the second input unit 94 are revealed. At this time, the slide pin 4 reaches the lower end of the first guide portion 24, and the carriages 31 and 32 of the slider 3 come into contact with the lower wall surface 86 of the opening 84 of the front housing 80. Hence, though urged downward by the urging mechanism 5, the slider 3 will not move relative to the base 2 further downward of this lowermost position. That is, the front housing 80 will not move further upward relative to the rear housing 90.

As described above, the user merely slides the slider 3 from the original position to where the slide pin 4 is at the same position as the rotation shaft 51 in the vertical direction, then the slider 3 slides to the lowermost position by the urging force of the urging mechanism 5. That is, the user needs not slide the slider 3 all the way from the original position to the lowermost position. Hence, the user does not have to slide the front housing 80 or the slider 3 over a long distance. Therefore, the user can easily open the front housing 80 upward with a fingertip.

Further, the slide pin 4 slides downward along the first guide portion 24 while being hooked on the second hook portion 37. This makes the sliding smooth for the user.

(3) When the Slider 3 is Positioned at the Lowermost Position (FIG. 2, FIG. 8)

The slide pin 4 is urged downward by the urging mechanism 5 while being hooked on the second hook portion 37. This makes it difficult for the slider 3 to move upward from the lowermost position. Hence, the slider 3 is kept positioned at the lowermost position. In this state, the second input unit 94 is revealed entirely, and the rear housing 90 is drawn out downward, as shown in FIG. 8.

(4) When the Slider 3 Slides from the Lowermost Position to the Original Position The user slides the front housing 80 downward relative to the rear housing 90. Then, the slider 3 slides upward relative to the base 2. Since the slide pin 4 is hooked on the second hook portion 37, the slide pin 4 moves upward together with the slider 3 along the first guide portion 24. At this time, the urging mechanism 5 rotates about the rotation shaft 51 clockwise as seen in the front elevation view.

Then, the slide pin 4 comes to a position upward of the rotation shaft 51. Since the slide pin 4 is hooked on the second hook portion 37, the slider 3 automatically slides upward relative to the base 2 by the urging mechanism 5. Along with this, the front housing 80 automatically slides downward relative to the rear housing 90. Hence, the user does not have to slide the front housing 80 or the slider 3 over a long distance.

Then, when the slider 3 moves to the original position, the slide pin 4 comes to the upper end of the first guide portion 24. The front surface of the rear housing 90 is entirely covered by the front housing 80.

(5) When the Slider 3 Slides from the Original Position to the Uppermost Position When the user slides the front housing 80 downward relative to the rear housing 90 from the state in which the slider 3 is at the original position, the slider 3 slides upward relative to the base 2. At this time, since the slide pin 4 abuts on the upper end of the first guide portion 24, the slide pin 4 does not move upward relative to the base 2. Meanwhile, since the slider 3 moves upward relative to the base 2 and the slide pin 4, the slide pin 4 moves relative to the slider 3 obliquely downward to the right along the second hook portion 37. Then, the slide pin 4 moves relative to the slider 3 from the second hook portion 37 to the second guide portion 36. In the meantime, the slide pin 4 moves relative to the base 2 from the upper end of the first guide portion 24 to the first hook portion 25. At this time, since the slide pin 4 slightly approaches the rotation shaft 51, the compression springs 58 of the urging mechanism 5 are compressed.

Figure 11:
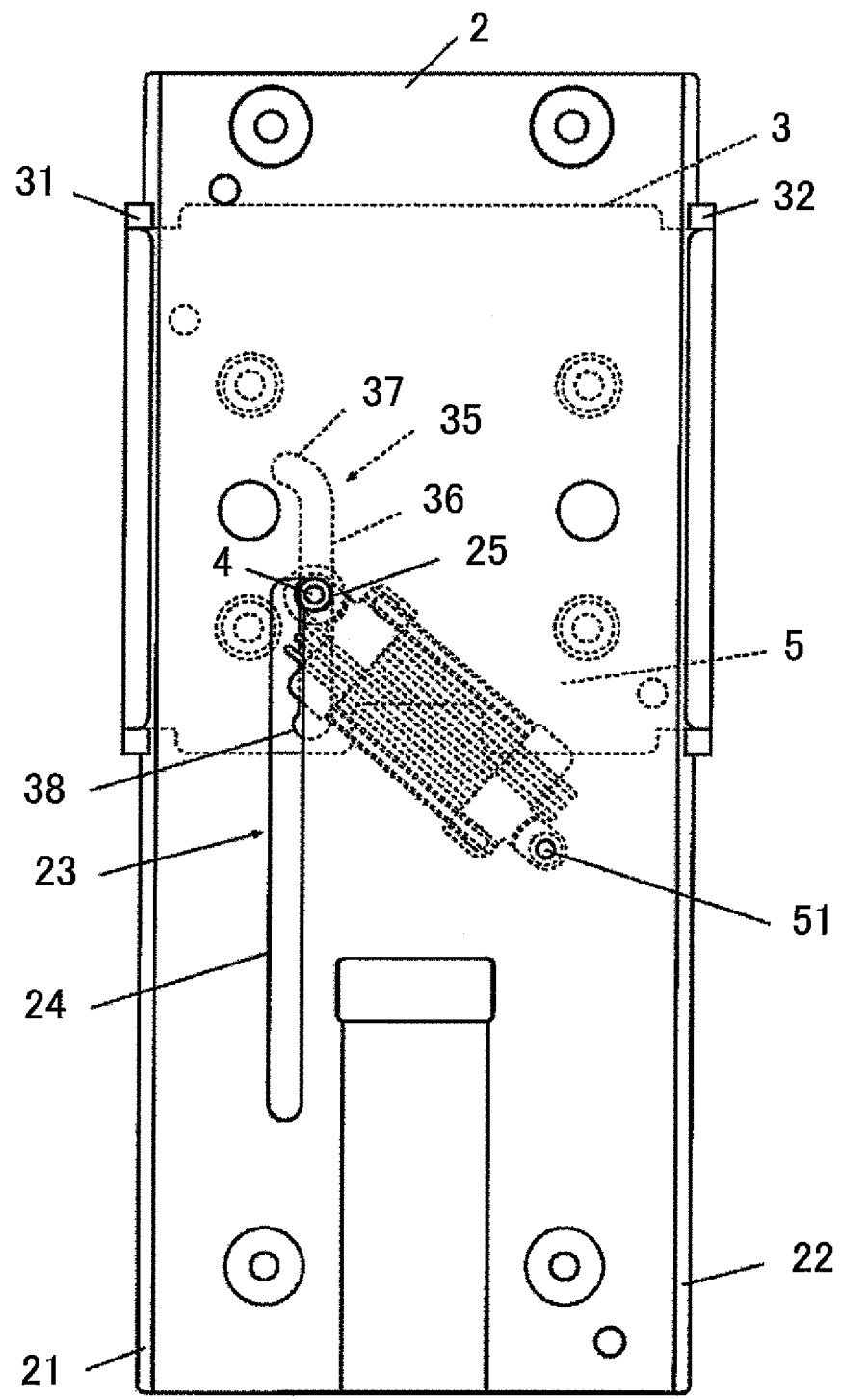
FIG. 11 is a front elevation showing the slide mechanism.

When the user slides the front housing 80 further downward relative to the rear housing 90, the slider 3 slides further upward relative to the base 2. At this time, since the slide pin 4 is hooked on the first hook portion 25, the slide pin 4 moves downward relative to the slider 3 along the second guide portion 36 (see FIG. 11). The slide pin 4 maintains the distance to the rotation shaft 51. Therefore, the urging mechanism 5 also maintains its condition.

The user continuously slides the front housing 80 downward relative to the rear housing 90. When the slider 3 moves to a position slightly downward of the uppermost position, the slide pin 4 has come to the lower end of the second guide portion 36. Then when the slider 3 moves to the uppermost position, all the push buttons 91 of the first input unit 92 are revealed. The slide pin 4 is pushed by the urging mechanism 5 to come into the runout 38. At this time, the user can feel the urging force of the urging mechanism 5 as a click. Though the slide pin 4 comes in the runout 38, it does not entirely move to the upper end of the first guide portion 24. Actually, a part of the slide pin 4 moves to the upper end of the first guide portion 24, and the remaining part of the slide pin 4 is left in the first hook portion 25 hooked.

(6) When the Slider 3 is Positioned at the Uppermost Position (FIG. 3, FIG. 9)

The slide pin 4 is hooked on the runout 38. The slide pin 4 is pushed into the runout 38 by the urging mechanism 5. At this time, since the slide pin 4 is hooked on both the runout 38 and the first hook portion 25, the slider 3 can hardly move upward from the uppermost position. Hence, the slider 3 is kept positioned at the uppermost position. In this state, the first input unit 92 is entirely revealed and the rear housing 90 is drawn out upward, as shown in FIG. 9.

(7) When the Slider 3 Slides from the Uppermost Position to the Original Position When the user slides the front housing 80 upward relative to the rear housing 90, the slider 3 slides downward relative to the base 2. At this time, the slide pin 4 is released from the runout 38 to the second guide portion 36. The user can hence feel a click. Since the runout 38 is not formed up to the left edge of the first guide portion 24, the slide pin 4 is not to be released from the first hook portion 25 to the first guide portion 24.

Then, as the slider 3 slides downward relative to the base 2, the slide pin 4 moves upward relative to the slider 3 along the second guide portion 36. At this time, the slide pin 4 is hooked on the first hook portion 25.

Continuously, the user slides the front housing 80 upward relative to the rear housing 90. When the slider 3 moves to a position slightly upward of the original position, the slide pin 4 reaches the upper end of the second guide portion 36. Then, when the slider 3 moves to the original position, the slide pin 4 is pushed by the urging mechanism 5 to come into the second hook portion 37 and hooked on the second hook portion 37. Along with this, the slide pin 4 is entirely released from the first hook portion 25 to the first guide portion 24. The front surface of the rear housing 90 is entirely covered by the front housing 80. When the slide pin 4 is hooked on the second hook portion 37, the user can feel the urging force of the urging mechanism 5 as a click. At this time, the second hook portion 37 extends in a radial direction of the rotation shaft 51. Hence, the slide pin 4 is easily hooked on the second hook portion 37.

As described above, according to the present embodiment, since the guides 23 and 35 are independent of each other, the lengths of the guide portions 24 and 36 can be set independently. Accordingly, the range over which the front housing 80 slides upward from the state in which it overlaps with the rear housing 90 can be set separately from the range over which the front housing 80 slides downward from the state in which it overlaps with the rear housing 90.

Further, the display section 83 is provided on the front surface of the front housing 80, and the first input unit 92 is provided on the upper portion of the front surface of the rear housing 90. Furthermore, the second input unit 94 is provided on the lower portion of the front surface of the rear housing 90. Hence, the functions of the electronic apparatus 8 can be switched according to the posture of the electronic apparatus 8. That is, a function-switchable electronic apparatus 8 can be provided, if the function of the electronic apparatus 8 with the front housing 80 slid downward to reveal the first input unit 92 is different from the function of the electronic apparatus 8 with the front housing 80 slid upward to reveal the second input unit 94.

The slide pin 4 may have a roller, which is rotatably attached thereon and inserted in the guides 23 and 35. When the slide pin 4 moves along the guides 23 and 35, the roller rolls and realizes a smooth movement.

<Second Embodiment>

Figure 12A:
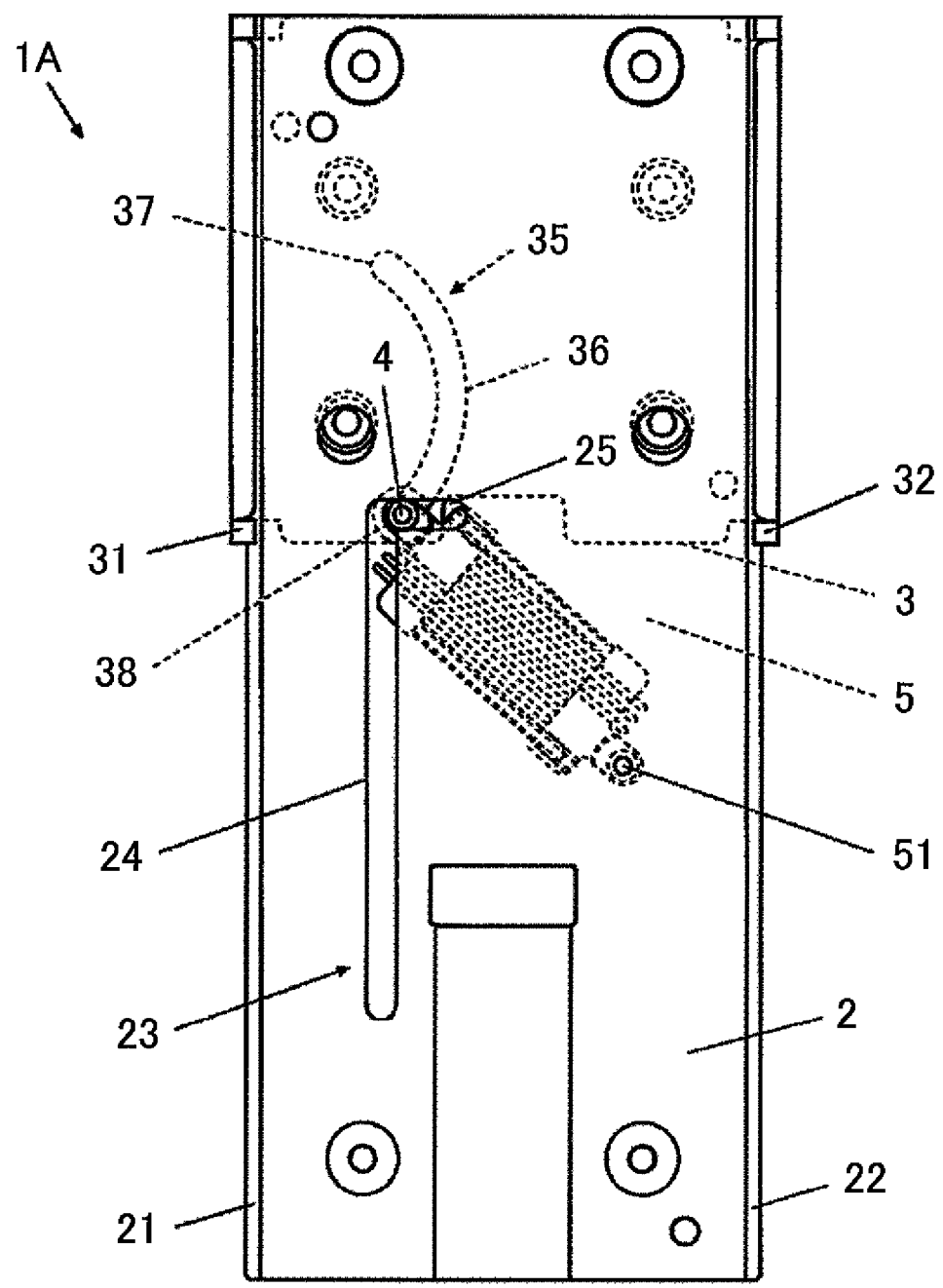
FIG. 12A is a front elevation showing a slide mechanism according to the second embodiment of the present invention.
Figure 12B:
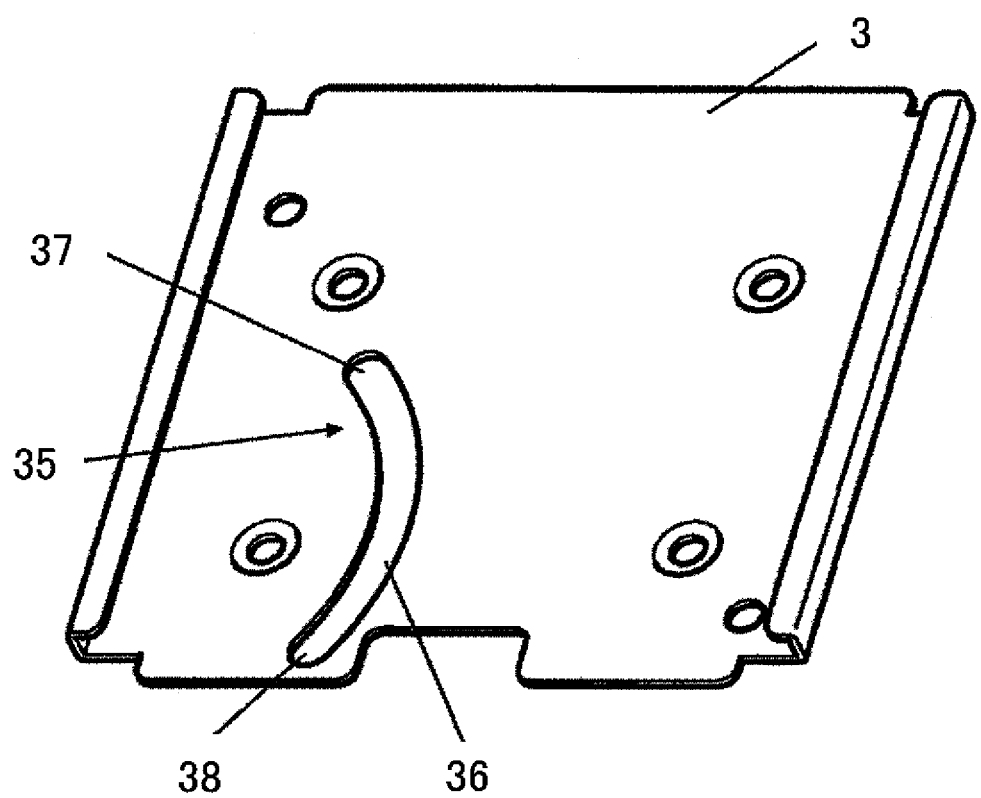
FIG. 12B is a perspective diagram showing a slider provided in the slide mechanism.

FIG. 12A is a front elevation of a slide mechanism 1A according to the second embodiment. FIG. 12B shows a slider 3 provided in this slide mechanism 1A. Any corresponding components of the slide mechanism 1A according to the second embodiment and the slide mechanism 1 according to the first embodiment will be denoted by the same reference numerals.

According to the first embodiment, the second guide portion 36 of the guide 35 formed in the slider 3 extends straight in the vertical direction as shown in FIG. 1, FIG. 5, etc. As compared with this, according to the second embodiment, the second guide portion 36 of the guide 35 formed in the slider 3 curves like an arch that is convex to the right, as shown in FIG. 12. The guide 35 as a whole also curves like an arch. Further, the right end of the first hook portion 25 is at the same position as the right apex of the second guide portion 36 (i.e., the portion of the second guide portion 36 that is at the rightmost) in the horizontal direction.

Other than the above, the corresponding components of the slide mechanism 1A according to the second embodiment and the slide mechanism 1 according to the first embodiment are provided in the same manner. The slide mechanism 1A is provided between the front housing 80 and the rear housing 90 in the same manner as the slide mechanism 1 according to the first embodiment. The front housing 80 and the rear housing 90 are joined by the slide mechanism 1A.

The second guide portion 36 curves like an arch. Hence, when the slider 3 slides from the original position to the uppermost position or vice versa, the urging force of the urging mechanism 5 changes. This will be specifically explained below.

When the user slides the front housing 80 downward relative to the rear housing 90 from the state in which the slider 3 is at the original position, the slider 3 slides upward relative to the base 2. Then, since the slide pin 4 hits on the upper end of the first guide portion 24, the slide pin 4 does not move upward relative to the base 2. Meanwhile, since the slider 3 moves upward relative to the base 2 and the slide pin 4, the slide pin 4 moves relative to the slider 3 from the second hook portion 37 to the second guide portion 36. Further, the slide pin 4 moves relative to the base 2 from the upper end of the first guide portion 24 to the first hook portion 25.

When the user slides the front housing 80 further downward relative to the rear housing 90, the slider 3 moves further upward relative to the base 2. At this time, since the slide pin 4 is hooked on the first hook portion 25, the slide pin 4 moves relative to the slider 3 along the second guide portion 36. Since the second guide portion 36 curves like an arch, the slide pin 4 moves rightward along the first hook portion 25. Hence, the slide pin 4 receives a stronger urging force from the urging mechanism 5. That is, the slide pin 4 shortens the distance to the rotation shaft 51 and the first movable portion 52 and the second movable portion 55 come closer to each other. Hence, the compression springs 58 are compressed to exert a stronger repulsive force. If the user loses hold of the front housing 80 or the rear housing 90 before the slide pin 4 reaches the right apex of the second guide portion 36, the slide pin 4 is forced to return to the second hook portion 37 by the urging force of the urging mechanism 5. As a result, the slider 3 slides downward and returns to the original position.

The user continuously slides the front housing 80 downward relative to the rear housing 90, and the slider 3 slides upward relative to the base 2. Then, the slide pin 4 reaches the right apex of the second guide portion 36. At this time, the urging force of the urging mechanism 5 becomes the strongest. The user further slides the front housing 80 downward relative to the rear housing 90, and the slider 3 slides upward relative to the base 2. At this time, the movement of the slide pin 4 relative to the slider 3 is left-downward along the second guide portion 36. When the slide pin 4 moves to a position downward of the right apex of the second guide portion 36, the slider 3 automatically slides upward relative to the base 2 as aided by the urging mechanism 5. Along with this, the front housing 80 automatically slides downward relative to the rear housing 90. Then, when the slider 3 moves to the uppermost position, all the push buttons 91 on the first input unit 92 are revealed. Further, the slide pin 4 comes in the runout 38 as pushed by the urging mechanism 5 (FIG. 12A). Though the slide pin 4 comes in the runout 38, a part of the slide pin 4 moves to the upper end of the first guide portion 24, but the remaining part of the slide pin 4 is left hooked on the first hook portion 25.

As described above, the user merely slides the slider 3 from the original position to where the slide pin 4 is at the same position as the right apex of the second guide portion 36 in the vertical direction, and the slider 3 slides to the uppermost position with the urging force of the urging mechanism 5. That is, the user needs not slide the slider 3 from the original position to the uppermost position. Accordingly, the user can does not have to slide the front housing 80 or the slider 3 over a long distance. Therefore, the user can easily open the front housing 80 downward with a fingertip.

When the user slides the front housing 80 upward relative to the rear housing 90 from the state in which the slider 3 is at the uppermost position, the slider 3 slides downward relative to the base 2. At this time, since the slide pin 4 hits on the first hook portion 25, the slide pin 4 does not move downward relative to the base 2. Meanwhile, since the slider 3 moves downward relative to the base 2 and the slide pin 4, the slide pin 4 moves relative to the slider 3 along the runout 38 and the second guide portion 36. The slide pin 4 moves relative to the base 2 rightward along the first hook portion 25. Hence, the urging force of the urging mechanism 5 becomes stronger. The user further slides the front housing 80 upward relative to the rear housing 90, and the slider 3 slides downward relative to the base 2. At this time, the slide pin 4 moves relative to the slider 3 right-upward along the second guide portion 36. Then, when the slide pin 4 moves to a position upward of the right apex of the second guide portion 36, the slide pin 4 moves relative to the slider 3 left-upward along the second guide portion 36 with the urging force of the urging mechanism 5. As a result, the slider 3 automatically slides downward relative to the base 2. Along with this, the front housing 80 automatically slides upward relative to the rear housing 90. Then, when the slider 3 moves to the original position, the slide pin 4 is pushed by the urging mechanism 5 to come in the second hook portion 37 to be hooked on the second hook portion 37. At the same time, the whole of the slide pin 4 is released from the first hook portion 25 to the first guide portion 24. And the front surface of the rear housing 90 is entirely covered by the front housing 80.

In a case where the slider 3 slides from the original position to the lowermost position or vice versa, the slide mechanism 1A according to the second embodiment works the same way as the slide mechanism 1 according to the first embodiment.

<Third Embodiment>

Figure 13:
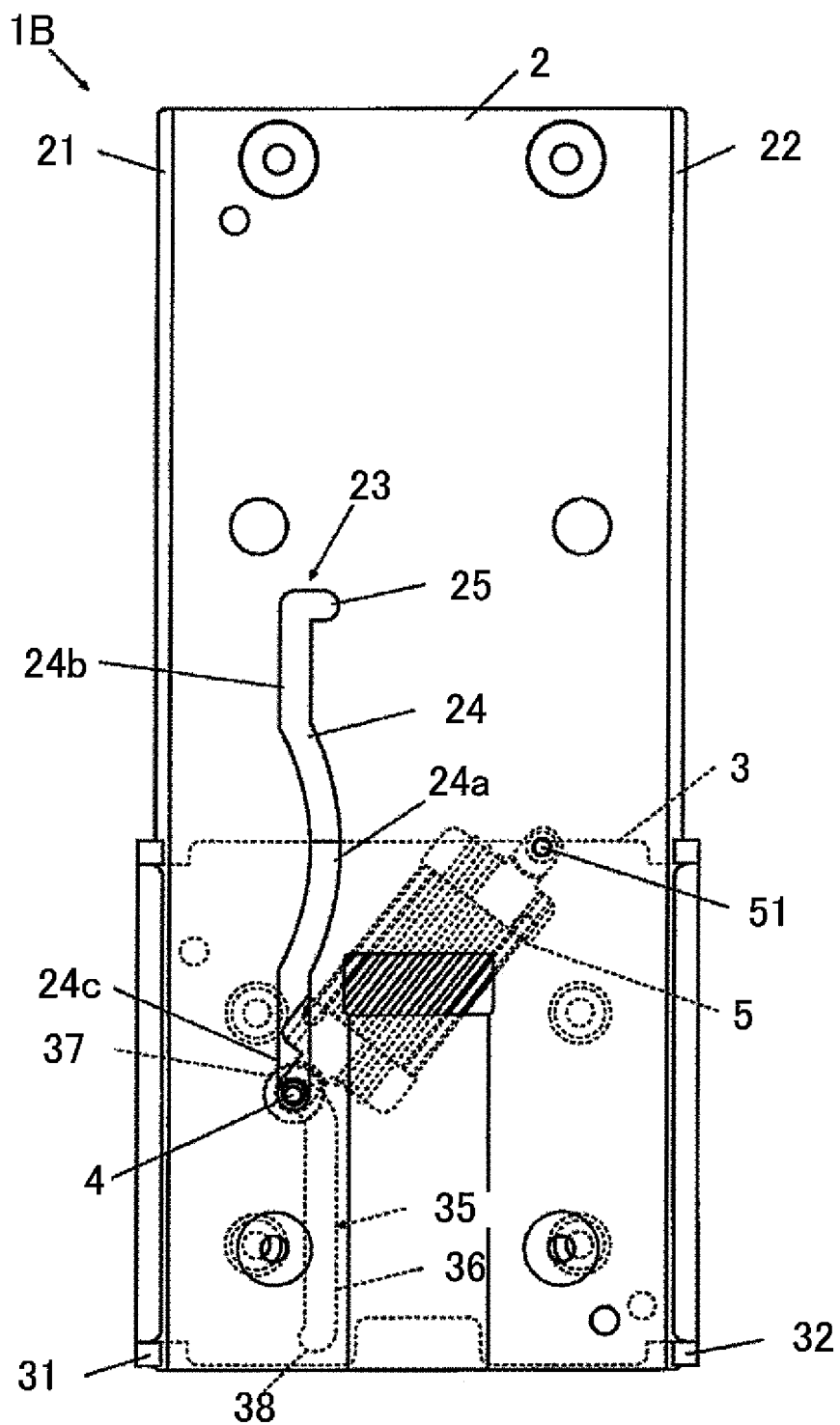
FIG. 13 is a front elevation showing a slide mechanism according to the third embodiment of the present invention.

FIG. 13 is a front elevation of a slide mechanism 1B according to the third embodiment. Any corresponding components of the slide mechanism 1B according to the third embodiment and the slide mechanism 1 according to the first embodiment will be denoted by the same reference numerals.

According to the first embodiment, the first guide portion 24 of the guide 23 formed in the base extends straight in the vertical direction as shown in FIG. 1, etc. As compared with this, according to the third embodiment, a middle portion 24a of the first guide portion 24, which is middle in the vertical direction, curves like an arch that is convex to the right, as shown in FIG. 13. An upper portion 24b and lower portion 24c of the first guide portion 24 extend straight in the vertical direction. The right apex of the middle portion 24a of the first guide portion 24 is at the same position as the rotation shaft 51 in the vertical direction.

Other than the above respects, the corresponding components of the slide mechanism 1B according to the third embodiment and the slide mechanism 1 according to the first embodiment are provided in the same manner. The slide mechanism 1B is provided between the front housing 80 and the rear housing 90 in the same manner as the slide mechanism 1 according to the first embodiment. The front housing 80 and the rear housing 90 are joined by the slide mechanism 1B.

According to the present embodiment, the middle portion 24a of the first guide portion 24 is provided in an arch shape that is convex to the right. Hence, when the slider 3 slides from the original position to the lowermost position or vice versa, the repulsive force of the urging mechanism 5 is stronger than that in the first embodiment.

The middle portion 24a of the first guide portion 24 may be provided, not in an arch shape that is convex to the right, but in an arch shape that is convex to the left. In this case, when the slider 3 slides from the original position to the lowermost position or vice versa, the repulsive force of the urging mechanism 5 is weaker than that in the first embodiment.

The first guide portion 24 may not have a middle portion 24a that is provided in an arch shape that is convex to the right, but be provided in a wavy shape that meanders from the upper end to the lower end. As a result, when the slider 3 slides from the original position to the lowermost position or vice versa, the repulsive force of the urging mechanism 5 can be increased or decreased.

Where the first guide portion 24 extends in the vertical direction, by appropriately changing the shape of the first guide portion 24, it is possible to change as needed the repulsive force of the urging mechanism 5 that is exerted when the slider 3 slides from the original position to the lowermost position or vice versa. For example, the first guide portion 24 may extend straight but obliquely with respect to the sliding direction of the slider 3.

The shape of the first guide portion 24 explained in the present embodiment may be applied to the first guide portion 24 of the slide mechanism 1A according to the second embodiment.

<Fourth Embodiment>

FIG. 14 to FIG. 18 are front elevations of a slide mechanism 1C according to the fourth embodiment. FIG. 19 is a perspective diagram showing an urging mechanism provided in the slide mechanism 1C. Any corresponding components of the slide mechanism 1C according to the fourth embodiment and the slide mechanism 1 according to the first embodiment will be denoted by the same reference numerals.

According to the first embodiment, the compression springs 58 are used as the urging mechanism 5 as shown in FIG. 1, FIG. 6, etc. As compared with this, according to the fourth embodiment, tension springs 101 are used as the urging mechanism 5 as shown in FIG. 14 to FIG. 19.

The urging mechanism 5 according to the present embodiment will be specifically explained.

One end of a shaft 102 is fixed to the rotation shaft 51. The shaft center of the 20 shaft 102 is perpendicular to the shaft center of the rotation shaft 51. The other end of the shaft 102 has a spring hanger 103. A movable member 104 is attached to the shaft 102. The movable member 104 is slidable along the shaft 102. A slide pin 4 is attached to the movable member 104. The movable member 104 has a spring hanger 105. The spring hanger 105 is closer to the rotation shaft 51 than the spring hanger 103 is. One end of the springs 101 is hung from the spring hanger 103, and the other end of the springs 101 is hung from the spring hanger 105. At this time, the spring hanger 105 is urged toward the spring hanger 103 by the tensile force of the springs 101.

The shaft 102, the movable member 104, the spring hangers 103 and 105, and the tension springs 101 are provided between the rear surface of the base 2 and the front surface of the slider 3. The slide pin 4 is inserted in the guide 23 and the guide 35. A flange 41 is attached on the top of the slide pin 4. The flange 41 is hooked on the front surface of the base 2 at both sides of the guide 23. The rotation shaft 51 is attached to the base 2 likewise in the first embodiment. In this case, the shaft 102 is rotatable about the shaft center of the rotation shaft 51. The position at which the rotation shaft 51 is set is the same as in the first embodiment. The urging mechanism 5 urges the slide pin 4 away from the rotation shaft 51 with the tensile force of the tension springs 101.

Other than the above, the corresponding components of the slide mechanism 1C according to the fourth embodiment and the slide mechanism 1 according to the first embodiment are provided in the same manner. The slide mechanism 1C is provided between the front housing 80 and the rear housing 90 in the same manner as the slide mechanism 1 according to the first embodiment. The front housing 80 and the rear housing 90 are joined by the slide mechanism 1C.

Figure 14:
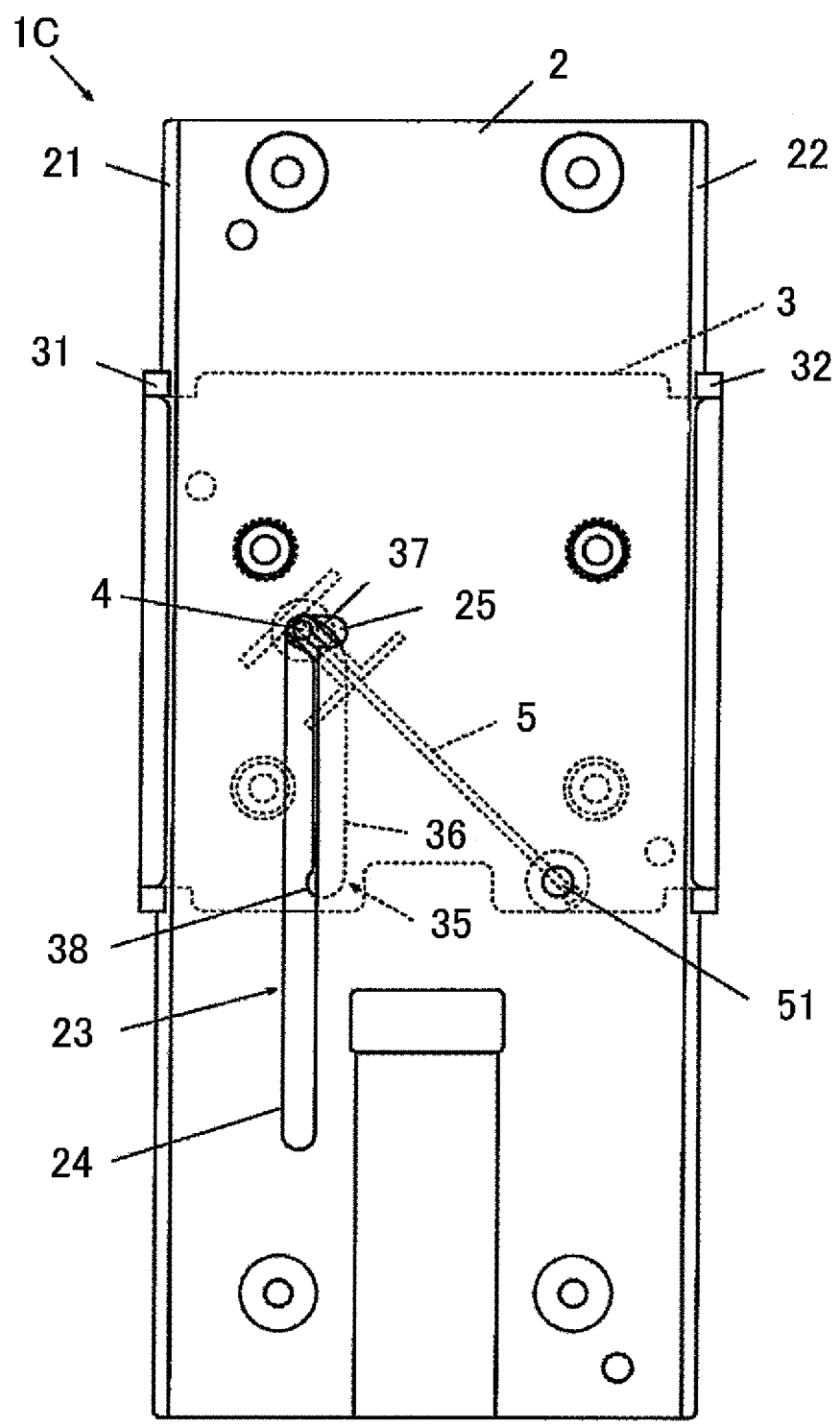
FIG. 14 is a front elevation showing a slide mechanism according to the fourth embodiment of the present invention.

FIG. 14 is a diagram showing a state in which the slider 3 is positioned at the original position. As shown in FIG. 14, the slide pin 4 is hooked on the second hook portion 37 and positioned at the tip of the second hook portion 37. Further, the slide pin 4 hits on the upper end of the first guide portion 24. Therefore, although the slide pin 4 is urged obliquely upward to the left by the urging mechanism 5, the slider 3 does not move upward.

Figure 15:
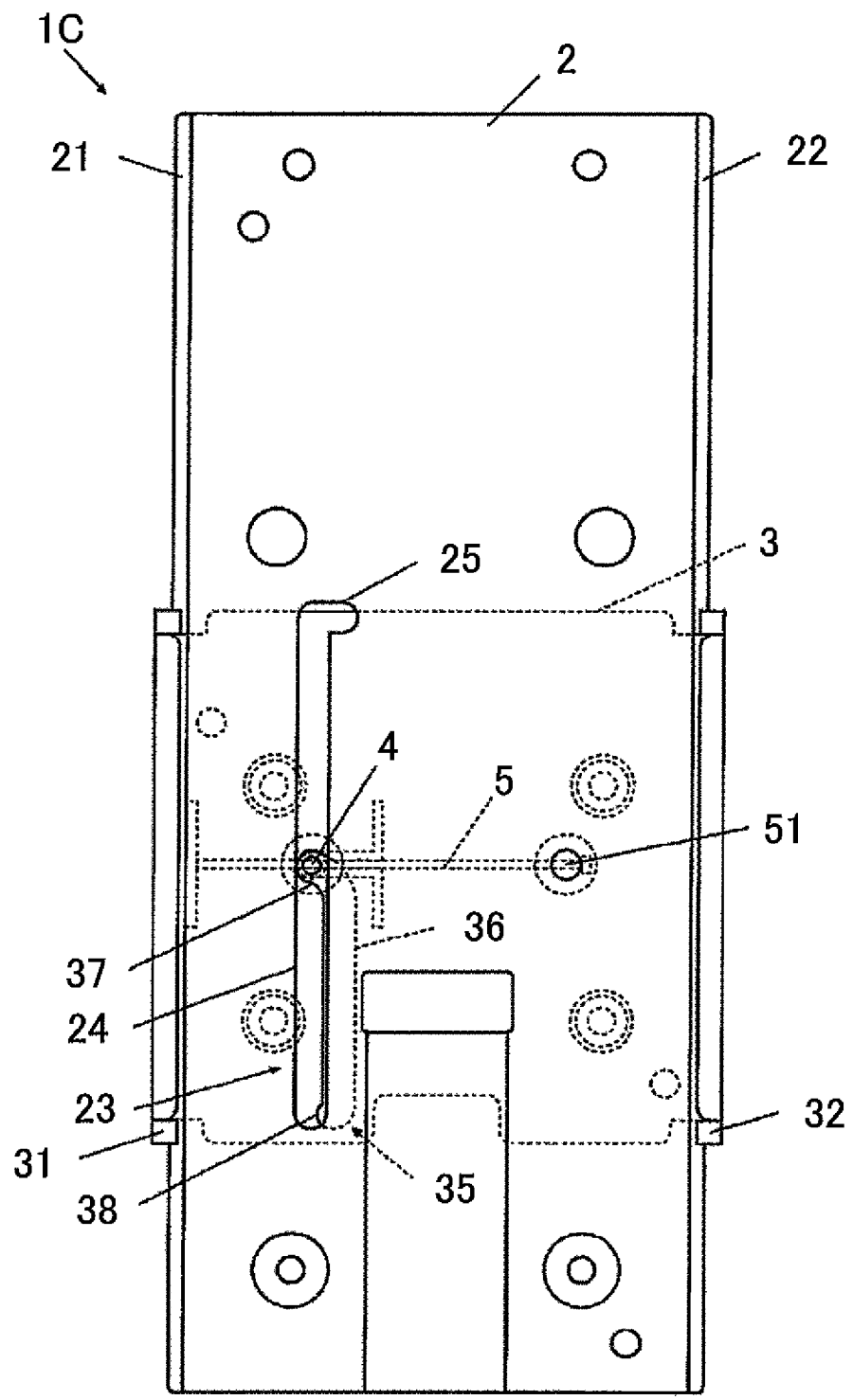
FIG. 15 is a front elevation showing the slide mechanism according to the fourth embodiment of the present invention.

FIG. 15 shows a state in which the slider 3 is positioned between the original position and the lowermost position. As shown in FIG. 15, the slider 3 slides from the original position to the lowermost position or vice versa. During this movement, the tension springs 101 (not shown in FIG. 15) applies its greatest tensile force when the slide pin 4 comes to the same position as the rotation shaft 51 in the vertical direction. When the slider 3 comes above the position of FIG. 15, the slider 3 slides to the original position with the tensile force of the tension springs 101. On the other hand, when the slider 3 comes below the position of FIG. 15, the slider 3 slides to the lowermost position with the tension force of the tension springs 101. Such movements are similar to those in the first embodiment.

Figure 16:
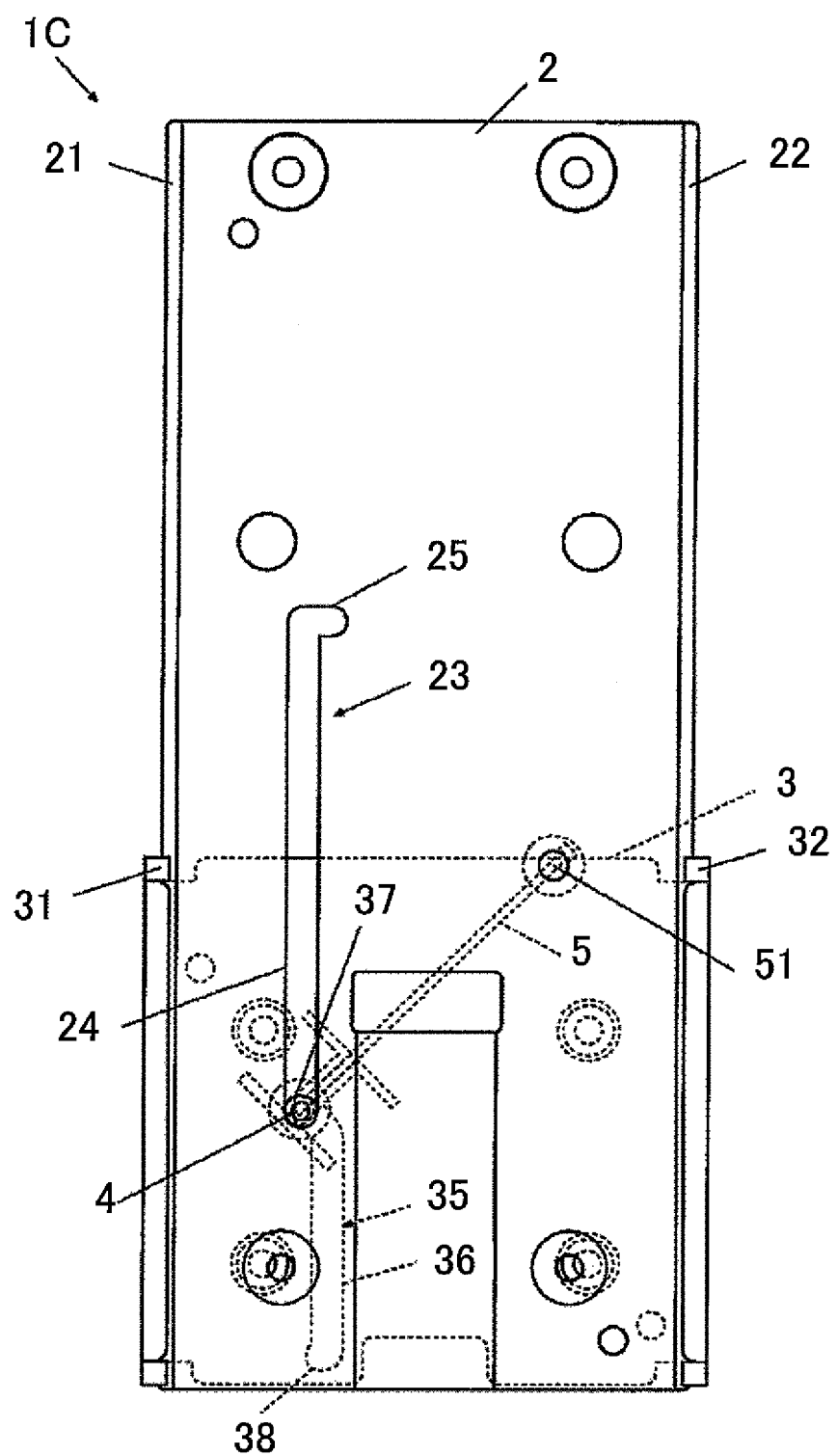
FIG. 16 is a front elevation showing the slide mechanism according to the fourth embodiment of the present invention.

FIG. 16 is a diagram showing a state in which the slider 3 is positioned at the lowermost position. As shown in FIG. 16, the slider 3 is urged downward by the urging mechanism 5 with the slide pin 4 hooked on the second hook portion 37. Hence, the slider 3 is retained at this position.

Figure 17:
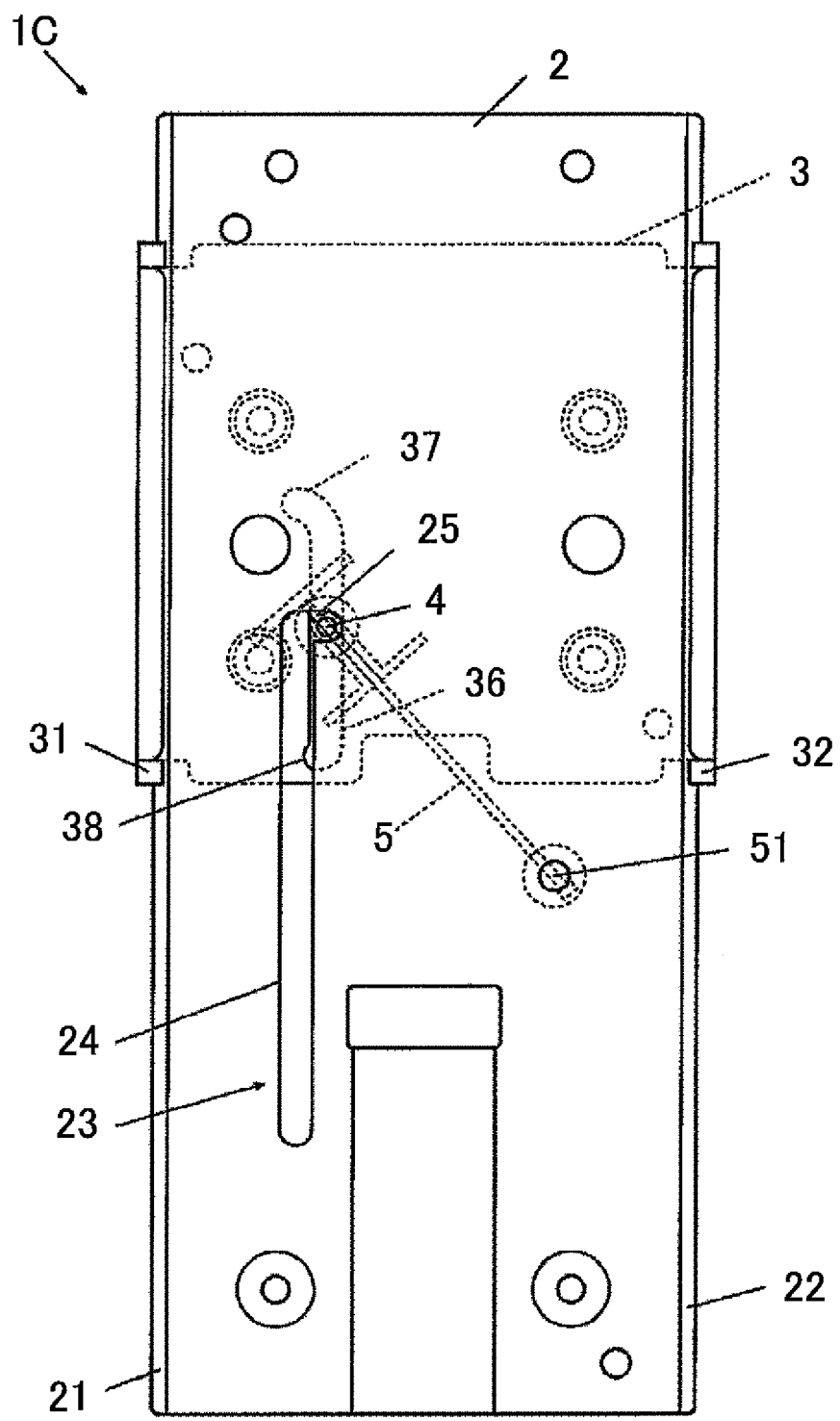
FIG. 17 is a front elevation showing the slide mechanism according to the fourth embodiment of the present invention.

FIG. 17 shows a state in which the slider 3 is positioned between the original position and the uppermost position. As shown in FIG. 17, when the slider 3 slides from the original position to the uppermost position or vice versa, the slide pin 4 is kept hooked on the first hook portion 25. Therefore, if the slider 3 slides, the slide pin 4 does not move relative to the base 2. Meanwhile, the slide pin 4 moves relative to the slider 3 along the second guide portion 36.

Figure 18:
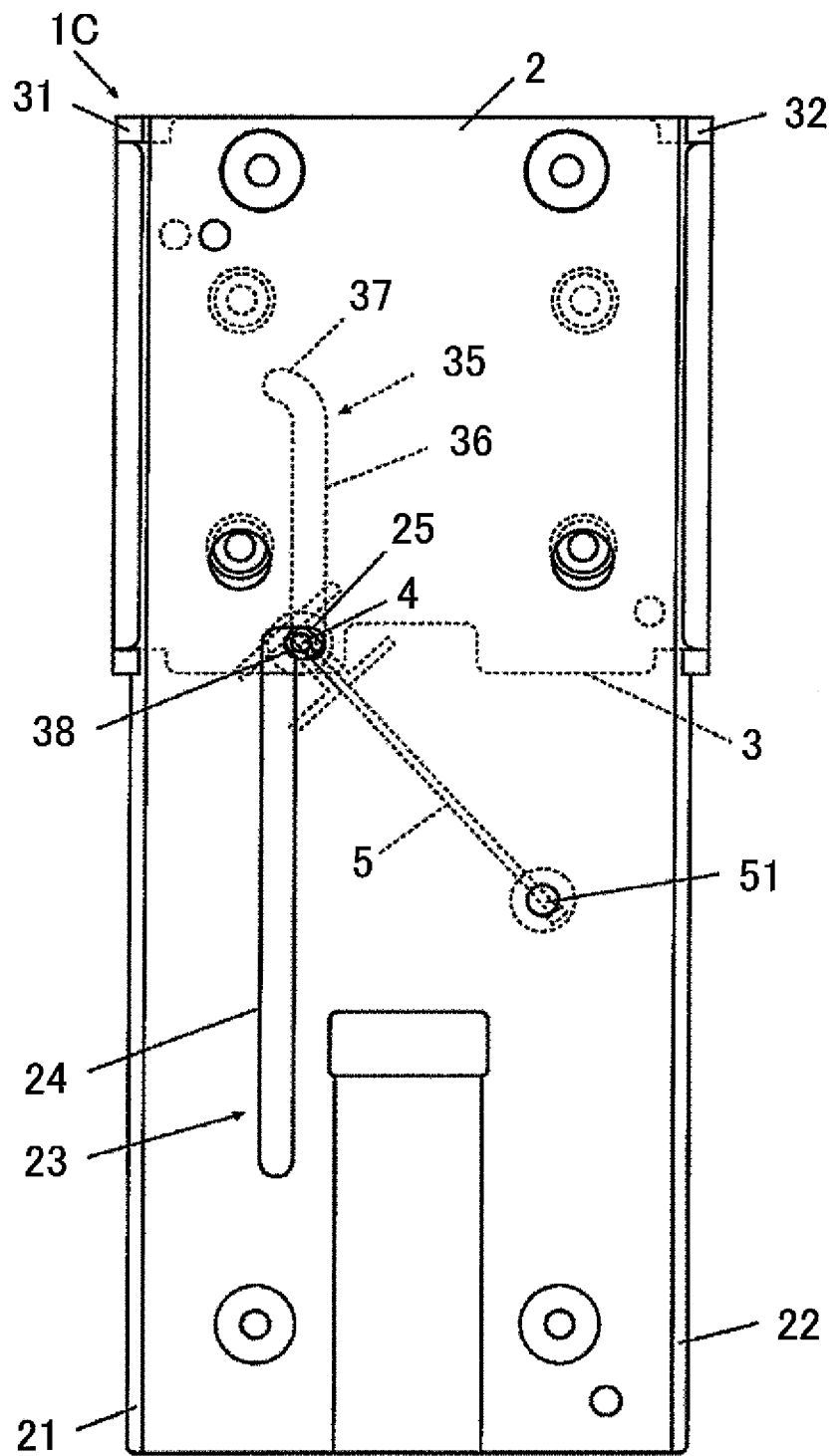
FIG. 18 is a front elevation showing the slide mechanism according to the fourth embodiment of the present invention.
Figure 19:
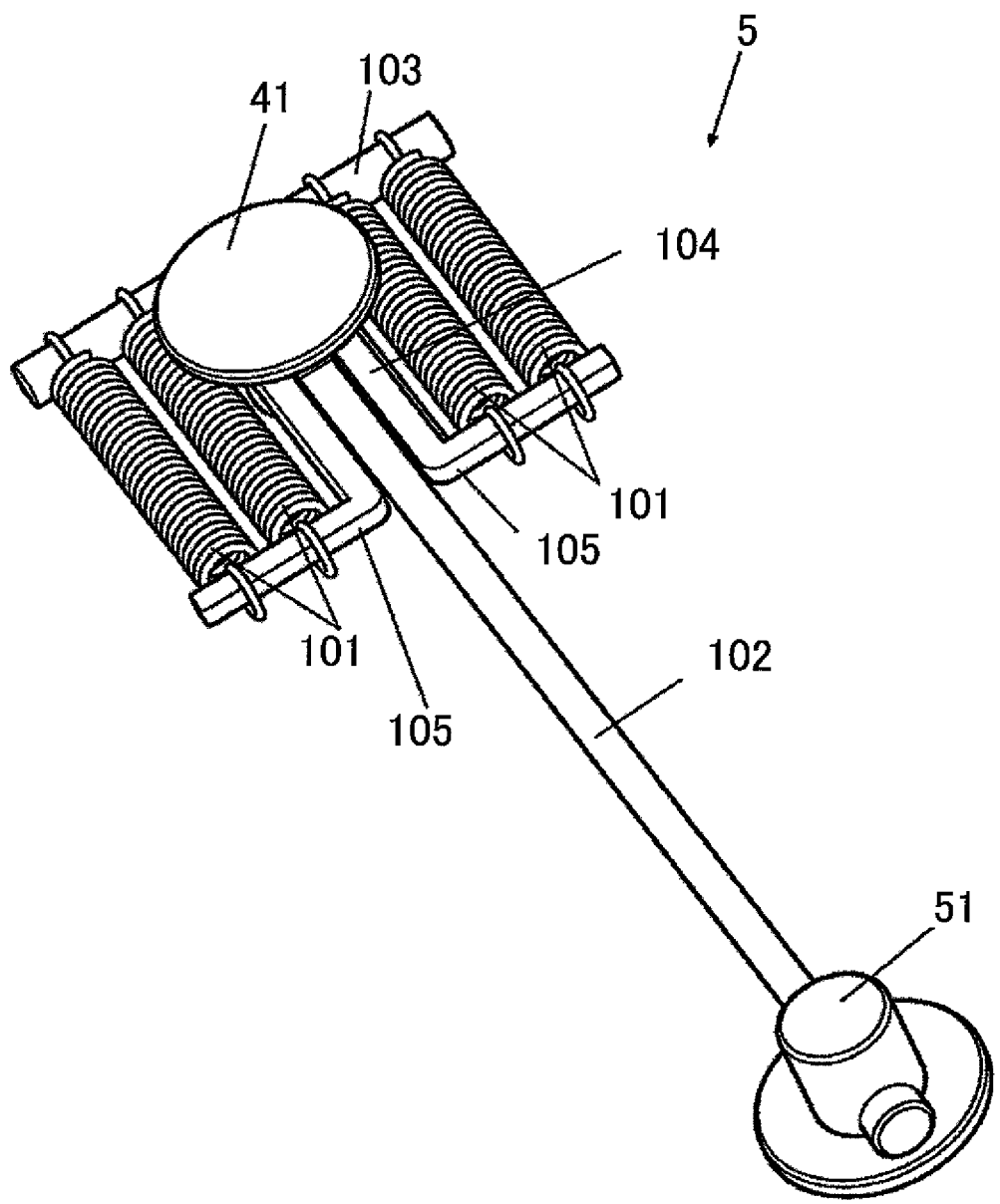
FIG. 19 is a perspective diagram showing an urging mechanism provided in the slide mechanism according to the fourth embodiment of the present invention.

FIG. 18 is a diagram showing a state in which the slider 3 is positioned at the uppermost position. As shown in FIG. 18, the slide pin 4 is hooked on the runout 38. Further, the slide pin 4 is pushed into the runout 38 by the urging mechanism 5. Furthermore, the slide pin 4 is hooked on both the runout 38 and the first hook portion 25. Therefore, the slider 3 is retained at this position.

The urging mechanism 5 may be a torsion spring. In this case, one arm of the torsion spring is attached to the slide pin 4. The slide pin 4 is rotatable relative to the torsion spring about the shaft center of the slide pin 4. Meanwhile, the other arm of the torsion spring is attached to the rotation shaft 51. The rotation shaft 51 is rotatable relative to the torsion spring about the shaft center of the rotation shaft 51. The slide pin 4 is urged away from the rotation shaft 51 by the torsion spring.

The slider 3 shown in FIG. 12B, in which the guide 35 curving like an arch is formed, may be applied to the slide mechanism 1C shown in FIG. 14, etc. Further, the base 2 shown in FIG. 13, in which the guide 23 having a curving portion (24a) is formed, may be applied to the slide mechanism 1C shown in FIG. 14, etc.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-187414 filed on Jul. 18, 2008 and including specification, claims, drawings and summary. The disclosure of the above Japanese Patent Application is incorporated herein by reference in its entirety.

What is claimed is:

1. A slide mechanism, comprising;
a slide member;
a base in which a first guide portion and a first hook portion are formed, the first guide portion guiding the slide member in a first direction relative to the base, the first hook portion being formed integrally with an end of the first guide portion and bent at the one end of the first guide portion, the slide member being hookable on the first hook portion;
a slider slidable relative to the base in the first direction relative to the base and in which a second guide portion, a second hook portion, and a runout are formed, the second guide portion guiding the slide member in the first direction relative to the base, the second hook portion being formed integrally with an end of the second guide portion, the slide member being hookable on the second hook portion, the runout being formed integrally with another end of the second guide portion; and
an urging mechanism having one end attached to the slide member and another end rotatably attached to the base such that a position of the other end of the urging mechanism in the first direction relative to the base is between both ends of the first guide portion, the urging mechanism urging the slide member away from the other end of the urging mechanism;
wherein the first hook portion is bent at the first guide portion to a side on which the other end of the urging mechanism exists;
wherein the first guide portion and the second guide portion are at different positions in a second direction, which is orthogonal to the first direction, and the second guide portion and the first hook portion are at a same position in the second direction as each other; and
wherein the second guide portion extends straight in the first direction.

2. The slide mechanism according to claim 1, wherein the second guide portion slides in the first direction relative to the base while the slide member is hooked on the first hook portion.

3. The slide mechanism according to claim 1, wherein both ends of the first guide portion and the second hook portion are at a same position as each other in the second direction relative to the base.

4. The slide mechanism according to claim 3, wherein the slide member slides along the first guide portion while the slide member is hooked on the second hook portion.

5. The slide mechanism according to claim 3, wherein in a state in which the slide member is positioned at the end of the first guide portion and hooked on the second hook portion, the second hook portion extends in a radial direction around the other end of the urging mechanism.

6. The slide mechanism according to claim 3, wherein the first guide portion extends straight in the first direction relative to the base.

7. The slide mechanism according to claim 3, wherein a portion between both ends of the first guide portion is formed in an arch shape such that the portion is convex to the side on which the other end of the urging mechanism exists.

8. The slide mechanism according to claim 7, wherein an apex of the portion of the first guide portion that is formed in the arch shape is at a same position in the first direction relative to the base as the other end of the urging mechanism.

9. The slide mechanism according to claim 1, wherein the runout extends from the other end of the second guide portion to a position at which the runout overlaps with a part of the end portion of the first guide portion.

10. The slide mechanism according to claim 1, wherein the first guide portion and the first hook portion include a first groove or a first long hole, and the second guide portion, the second hook portion and the runout include a second groove or a second long hole, and the first groove or the first long hole and the second groove or the second long hole are independent of each other.

11. An electronic apparatus, comprising:
a front housing;
a rear housing facing the front housing; and
the slide mechanism according to claim 1;
wherein the base is attached to the front housing, and the slider is attached to the rear housing.

12. The electronic apparatus according to claim 11, wherein an opening is formed in a rear surface of the front housing, and the base is set inside the opening and the slider partially enters the opening, and a range over which the slider slides in the first direction relative to the base is between a first position and a second position, wherein when the slider is at the first position, the other end of the first guide portion and the second hook portion are aligned with each other and the slider contacts one wall surface of the opening, the one wall surface opposing the other wall surface of the opening in the first direction relative to the base, and when the slider is at the second position, the runout and the first hook portion are aligned with each other and the slider contacts the other of the opposing wall surfaces of the opening.

13. The electronic apparatus according to claim 11, further comprising:

a first input unit that is provided on an end portion on a front surface of the rear housing, the end portion being opposite to the other end portion in the first direction relative to the base with respect to a position on the rear housing to which the slider is attached; and a second input unit that is provided on the other end portion on the front surface of the rear housing, the other end portion being opposite to the one end portion in the first direction relative to the base with respect to the position on the rear housing to which the slider is attached.

14. The electronic apparatus according to claim 11, further comprising a display section provided on a front surface of the front housing.

15. A slide mechanism, comprising;

a slide member;

a base in which a first guide portion and a first hook portion are formed, the first guide portion guiding the slide member in a first direction relative to the base, the first hook portion being formed integrally with an end of the first guide portion and bent at the one end of the first guide portion, the slide member being hookable on the first hook portion;

a slider slidable relative to the base in the first direction relative to the base and in which a second guide portion, a second hook portion, and a runout are formed, the second guide portion guiding the slide member in the first direction relative to the base, the second hook portion being formed integrally with an end of the second guide portion, the slide member being hookable on the second hook portion, the runout being formed integrally with another end of the second guide portion; and an urging mechanism having one end attached to the slide member and another end rotatably attached to the base such that a position of the other end of the urging mechanism in the first direction relative to the base is between both ends of the first guide portion, the urging mechanism urging the slide member away from the other end of the urging mechanism;

wherein the first hook portion is bent at the first guide portion to a side on which the other end of the urging mechanism exists;

wherein the first guide portion and the second guide portion are at different positions in a second direction, which is orthogonal to the first direction, and the second guide portion and the first hook portion are at a same position in the second direction as each other; and wherein the second guide portion is formed in an arch shape such that the second guide portion is convex to the side on which the other end of the urging mechanism exists.

16. The slide mechanism according to claim 15, wherein the second guide portion slides in the first direction while the slide member is hooked on the first hook portion.

17. The slide mechanism according to claim 15, wherein both ends of the first guide portion and the second hook portion are at a same position as each other in the second direction relative to the base.

18. The slide mechanism according to claim 15, wherein the runout extends from the other end of the second guide portion to a position at which the runout overlaps with a part of the end portion of the first guide portion.

19. The slide mechanism according to claim 15, wherein the first guide portion and the first hook portion include a first groove or a first long hole, and the second guide portion, the second hook portion and the runout include a second groove or a second long hole, and the first groove or the first long hole and the second groove or the second long hole are independent of each other.

20. An electronic apparatus, comprising:

a front housing;

a rear housing facing the front housing; and the slide mechanism according to claim 15, wherein the base is attached to the front housing, and the slider is attached to the rear housing.

* * * * *